US012650765B1

(12) United States Patent
Moran Madrigal et al.

(10) Patent No.: US 12,650,765 B1
(45) Date of Patent: Jun. 9, 2026

(54) INPUT MECHANISM WITH MULTI-CHARACTER KEYS

(71) Applicant: Google LLC, Mountain View, CA (US)

(72) Inventors: Carlos Andres Moran Madrigal, San Francisco, CA (US); Shumin Zhai, Saratoga, CA (US); Zhi Li, Sunnyvale, CA (US); Haicheng Sun, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/080,673

(22) Filed: Mar. 14, 2025

(51) Int. Cl.
| | |
|---|---|
| *G06F 3/04886* | (2022.01) |
| *G06F 3/023* | (2006.01) |
| *G06F 3/0482* | (2013.01) |
| *G06F 3/0484* | (2022.01) |
| *G06F 40/166* | (2020.01) |

(52) U.S. Cl.
CPC ........ *G06F 3/04886* (2013.01); *G06F 3/0236* (2013.01); *G06F 3/0482* (2013.01); *G06F 3/0484* (2013.01); *G06F 40/166* (2020.01)

(58) Field of Classification Search
CPC .. G06F 3/04886; G06F 3/0236; G06F 3/0482; G06F 3/0484; G06F 40/166
USPC ........................................................ 345/169
See application file for complete search history.

(56) References Cited

U.S. PATENT DOCUMENTS

| | | | | |
|---|---|---|---|---|
| 2011/0258542 | A1* | 10/2011 | Kenney ................. | G06F 3/0487 715/702 |
| 2017/0285935 | A1* | 10/2017 | Cheon ................... | G06F 3/0236 |
| 2017/0308289 | A1* | 10/2017 | Kim ...................... | G06F 3/0237 |
| 2017/0336969 | A1* | 11/2017 | Bi .......................... | G06F 40/274 |
| 2020/0004417 | A1* | 1/2020 | Cheon ................... | G06F 1/1626 |

OTHER PUBLICATIONS

Qin et al., "Optimal-T9: An Optimized T9-like Keyboard for Small Touchscreen Devices", Session 4: Mobile and Wearable Text Entry, Nov. 25, 2018, pp. 137-146, URL: https://dl.acm.org/doi/10.1145/3279778.3279786.

* cited by examiner

*Primary Examiner* — Jimmy H Nguyen

(74) *Attorney, Agent, or Firm* — Shumaker & Sieffert, P.A.

(57) ABSTRACT

An example method includes outputting a graphical user interface including: a graphical keyboard comprising a plurality of character keys, the plurality of character keys including two to eight character keys; a text-editing region; and a word-suggestion region. The method also includes detecting a first user input at a location of the presence-sensitive display associated with a particular character key from the plurality of character keys. The method further includes, responsive to detecting the first user input, determining a first character associated with the particular character key. The method additionally includes outputting the first character for display within the text-editing region and a set of suggested words for display within the word-suggestion region. The method also includes, responsive to receiving a transition input via an input device of the computing device, transitioning a focus region from a location of the text-editing region to a location of the word-suggestion region.

20 Claims, 9 Drawing Sheets

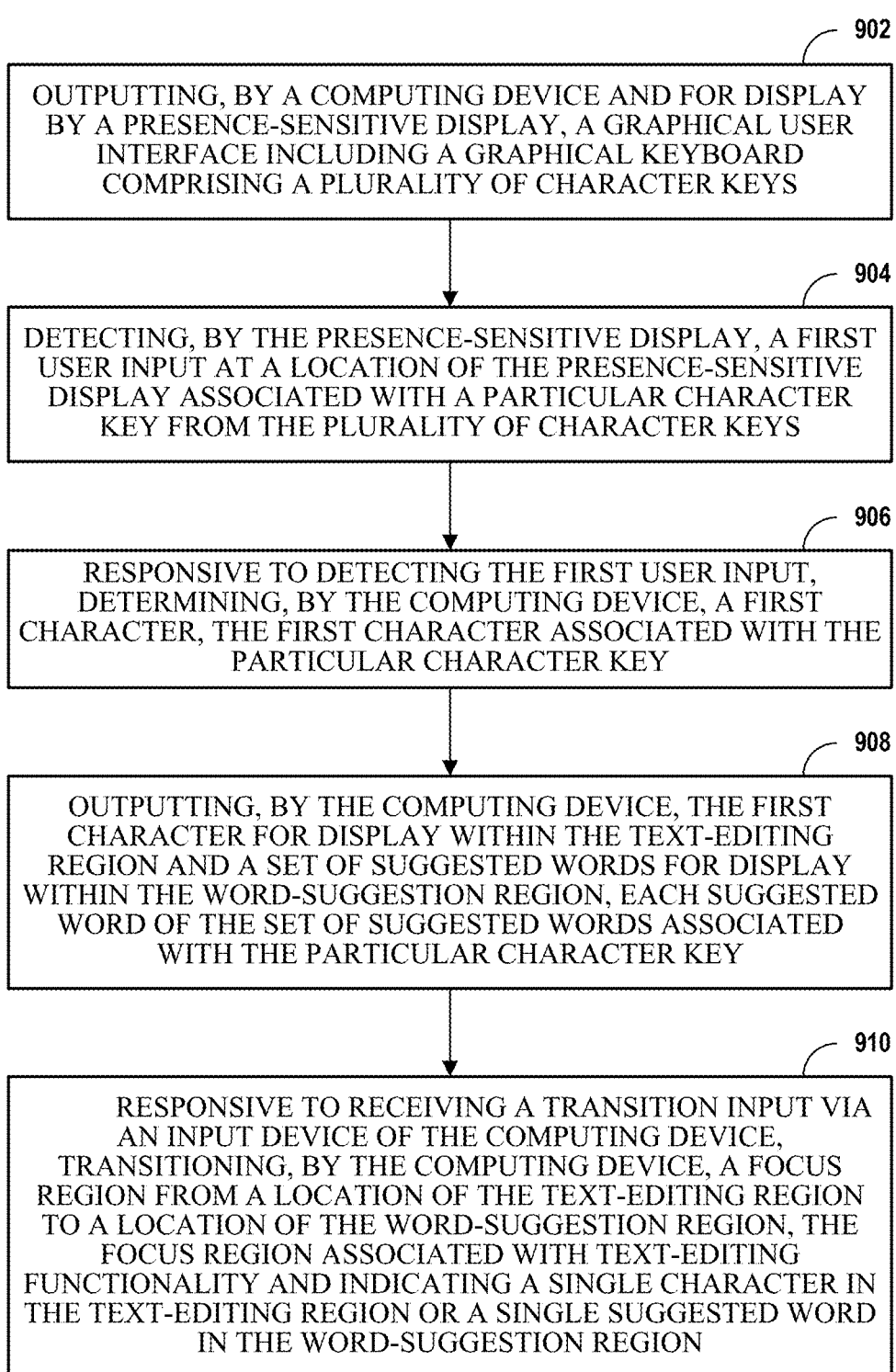

902

OUTPUTTING, BY A COMPUTING DEVICE AND FOR DISPLAY BY A PRESENCE-SENSITIVE DISPLAY, A GRAPHICAL USER INTERFACE INCLUDING A GRAPHICAL KEYBOARD COMPRISING A PLURALITY OF CHARACTER KEYS

904

DETECTING, BY THE PRESENCE-SENSITIVE DISPLAY, A FIRST USER INPUT AT A LOCATION OF THE PRESENCE-SENSITIVE DISPLAY ASSOCIATED WITH A PARTICULAR CHARACTER KEY FROM THE PLURALITY OF CHARACTER KEYS

906

RESPONSIVE TO DETECTING THE FIRST USER INPUT, DETERMINING, BY THE COMPUTING DEVICE, A FIRST CHARACTER, THE FIRST CHARACTER ASSOCIATED WITH THE PARTICULAR CHARACTER KEY

908

OUTPUTTING, BY THE COMPUTING DEVICE, THE FIRST CHARACTER FOR DISPLAY WITHIN THE TEXT-EDITING REGION AND A SET OF SUGGESTED WORDS FOR DISPLAY WITHIN THE WORD-SUGGESTION REGION, EACH SUGGESTED WORD OF THE SET OF SUGGESTED WORDS ASSOCIATED WITH THE PARTICULAR CHARACTER KEY

910

RESPONSIVE TO RECEIVING A TRANSITION INPUT VIA AN INPUT DEVICE OF THE COMPUTING DEVICE, TRANSITIONING, BY THE COMPUTING DEVICE, A FOCUS REGION FROM A LOCATION OF THE TEXT-EDITING REGION TO A LOCATION OF THE WORD-SUGGESTION REGION, THE FOCUS REGION ASSOCIATED WITH TEXT-EDITING FUNCTIONALITY AND INDICATING A SINGLE CHARACTER IN THE TEXT-EDITING REGION OR A SINGLE SUGGESTED WORD IN THE WORD-SUGGESTION REGION

FIG. 9

INPUT MECHANISM WITH MULTI-CHARACTER KEYS

BACKGROUND

Computing devices, such as wearable devices and mobile devices, implement graphical keyboards for collecting user input. These graphical keyboards interface with the computing device's input subsystem via an abstraction layer that translates touch or pointer coordinates into discrete input events. The computing device maps the input events to corresponding Unicode characters or command sequences via a lookup table stored in device memory, enabling the computing device to translate input events into characters for display on a graphical user interface. Additionally, input events may trigger haptic feedback mechanisms that use vibration controllers to provide tactile confirmation of received input.

SUMMARY

In general, techniques of this disclosure are directed to text input mechanisms. An example computing device may include a presence-sensitive display and one or more physical buttons, such as a rotating crown button. The computing device may output a graphical user interface that includes a graphical keyboard. The graphical keyboard may include two to eight keys, where each key may be associated with multiple characters. For example, the graphical keyboard may include four keys, where each key is associated with alphanumeric characters of a writing system. Responsive to detecting a user input at a location of the presence-sensitive display associated with one of the keys, the computing device may output a character of the key for display within a text-editing region of the graphical user interface. A decoder may predict subsequent characters based on one or more displayed characters to form candidate words included in a lexicon (e.g., a dictionary). In some implementations, the predicted subsequent characters are populated in the text-editing region following the displayed characters. Additionally, or alternatively, the decoder may generate a set of suggested words for display within a word-suggestion region of the graphical user interface. The decoder may assign a higher degree of certainty to characters input via an overlay in comparison to characters input via a keypress. In some implementations, the computing device may populate the text-editing region and word-suggestion region based on gesture input.

The graphical keyboard may support long-press based letter-level input. For instance, the computing device may receive a long-press input indicating a key. In response, the computing device may output a graphical overlay that includes each character associated with the long-pressed key. A focus region of the overlay may highlight an initial character. An input device, such as a crown, may be used to scroll through each character in the overlay. As the crown scrolls, the focus region of the overlay may transition by highlighting a subsequent character instead of the initial character. A confirmation button, such as a spacebar region of the graphical user interface, may then be used to select the highlighted character. The computing device may then populate the selected character within the text-editing region. Specifically, the computing device may populate the selected character within a focus region of the text-editing region. The computing device may transition the focus region forward or backward through individual characters of displayed text in the text-editing region based on input received from the crown. The computing device may also transition the focus region to highlight a word of the word-suggestion region. The computing device may receive a selected word from the word-suggestion region and, in response, populate the selected word in the text-editing region. Additionally, an overlay may be used to replace individual characters in the text-editing region that are indicated by the focus region. The computing device may then update the displayed set of suggested words responsive to replacing a character in the text-editing region.

In one example, the disclosure is directed toward a method that includes outputting, by a computing device and for display by a presence-sensitive display, a graphical user interface. The graphical user interface includes: a graphical keyboard comprising two or more character keys, where the two or more character keys include two to eight character keys, each character key from the two or more character keys being associated with and including a respective two or more characters, where all characters included in the two or more character keys form a complete alphabet of a writing system. The graphical user interface also includes a text-editing region and a word-suggestion region. The method further includes detecting, by the presence-sensitive display, a first user input at a location of the presence-sensitive display associated with a particular character key from the plurality of character keys. The method also includes, responsive to detecting the first user input, determining, by the computing device, a first character, where the first character is associated with the particular character key. The method additionally includes outputting, by the computing device, the first character for display within the text-editing region and a set of suggested words for display within the word-suggestion region, where each suggested word of the set of suggested words is associated with the particular character key. The method further includes, responsive to receiving a transition input via an input device of the computing device, transitioning, by the computing device, a focus region from a location of the text-editing region to a location of the word-suggestion region, the focus region associated with text-editing functionality and indicating a single character in the text-editing region or a single suggested word in the word-suggestion region.

In another example, the disclosure is directed toward a computing device comprising a presence-sensitive display, an input device, one or more processors, and one or more storage devices that store instructions. The instructions, when executed by the one or more processors, cause the one or more processors to output, for display by the presence-sensitive display, a graphical user interface. The graphical user interface includes a graphical keyboard comprising two or more character keys, where the two or more character keys include two to eight character keys, each character key from the two or more character keys being associated with and including a respective two or more characters, wherein all characters included in the two or more character keys form a complete alphabet of a writing system. The graphical user interface also includes a text-editing region and a word-suggestion region. The instructions further cause the one or more processors to detect a first user input at a location of the presence-sensitive display associated with a particular character key from the plurality of character keys. The instructions also cause the one or more processors to, responsive to detecting the first user input, determine a first character, where the first character is associated with the particular character key. The instructions additionally cause the one or more processors to output the first character for display within the text-editing region and a set of suggested words for display within the word-suggestion region, where each suggested word of the set of suggested words is associated with the particular character key. The instructions further cause the one or more processors to, responsive to receiving a transition input via the input device, transition a focus region from a location of the text-editing region to a location of the word-suggestion region, the focus region associated with text-editing functionality and indicating a single character in the text-editing region or a single suggested word in the word-suggestion region.

In another example, the disclosure is directed toward a non-transitory computer-readable storage medium encoded with instructions that, when executed by one or more processors, cause one or more processors to output, for display by the presence-sensitive display, a graphical user interface. The graphical user interface includes a graphical keyboard comprising two or more character keys, where the two or more character keys include two to eight character keys, each character key from the two or more character keys being associated with and including a respective two or more characters, wherein all characters included in the two or more character keys form a complete alphabet of a writing system. The graphical user interface also includes a text-editing region and a word-suggestion region. The instructions further cause the one or more processors to detect a first user input at a location of the presence-sensitive display associated with a particular character key from the plurality of character keys. The instructions also cause the one or more processors to, responsive to detecting the first user input, determine a first character, where the first character is associated with the particular character key. The instructions additionally cause the one or more processors to output the first character for display within the text-editing region and a set of suggested words for display within the word-suggestion region, where each suggested word of the set of suggested words is associated with the particular character key. The instructions further cause the one or more processors to responsive to receiving a transition input via the input device, transition a focus region from a location of the text-editing region to a location of the word-suggestion region, the focus region associated with text-editing functionality and indicating a single character in the text-editing region or a single suggested word in the word-suggestion region.

In another example, the disclosure is directed toward a computer program product for receiving input via multi-character keys. The computer program product comprises one or more instructions that, when executed by at least one processor, cause the at least one processor to output, for display by the presence-sensitive display, a graphical user interface. The graphical user interface includes a graphical keyboard comprising two or more character keys, where the two or more character keys include two to eight character keys, each character key from the two or more character keys being associated with and including a respective two or more characters, wherein all characters included in the two or more character keys form a complete alphabet of a writing system. The graphical user interface also includes a text-editing region and a word-suggestion region. The one or more instructions further cause the at least one processor to detect a first user input at a location of the presence-sensitive display associated with a particular character key from the plurality of character keys. The one or more instructions also cause the at least one processor to, responsive to detecting the first user input, determine a first character, where the first character is associated with the particular character key. The one or more instructions additionally cause the at least one processor to output the first character for display within the text-editing region and a set of suggested words for display within the word-suggestion region, where each suggested word of the set of suggested words is associated with the particular character key. The one or more instructions further cause the at least one processor to responsive to receiving a transition input via the input device, transition a focus region from a location of the text-editing region to a location of the word-suggestion region, the focus region associated with text-editing functionality and indicating a single character in the text-editing region or a single suggested word in the word-suggestion region.

The details of one or more examples of the disclosure are set forth in the accompanying drawings and the description below. Other features, objects, and advantages of the disclosure will be apparent from the description and drawings, and from the claims.

BRIEF DESCRIPTION OF THE FIGURES

FIG. 9 is a flowchart illustrating an example operation for receiving input and providing output via a GUI that uses multi-character keys, in accordance with one or more techniques of this disclosure.

DETAILED DESCRIPTION

Figure 1:
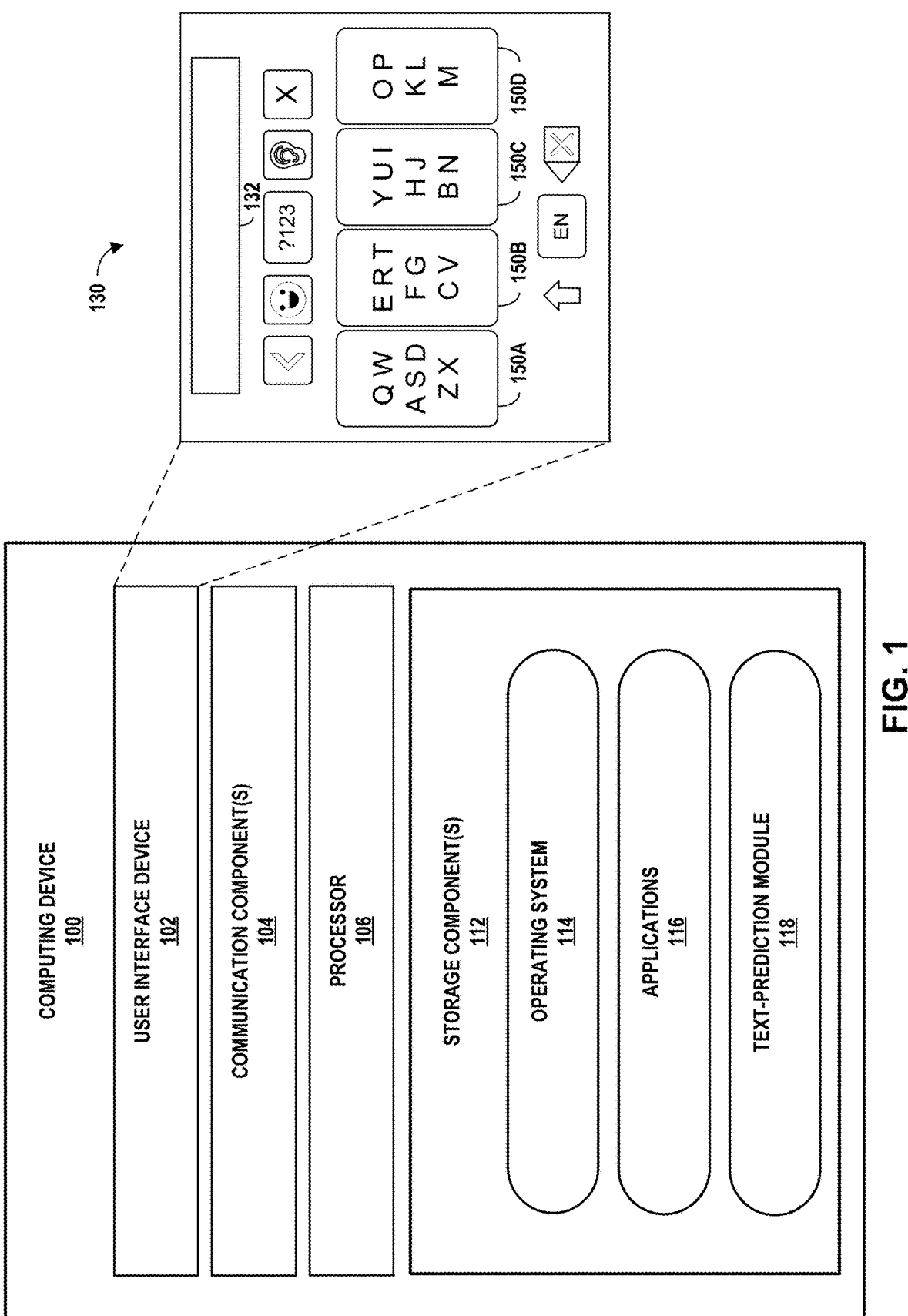
FIG. 1 is a conceptual diagram illustrating an example computing device for receiving input and providing output via a presence-sensitive display, in accordance with one or more techniques of this disclosure.

FIG. 1 is a conceptual diagram illustrating an example computing device for receiving input and providing output via a presence-sensitive display, in accordance with one or more techniques of this disclosure. In the example of FIG. 1, computing device 100 may be an individual mobile or non-mobile computing device. Examples of computing device 100 include a mobile phone, a tablet computer, a laptop computer, a desktop computer, a server, a mainframe, a set-top box, a television, a wearable device (e.g., a computerized watch, computerized eyewear, computerized headphones, computerized gloves, computerized ring, etc.), a home automation device or system (e.g., an intelligent thermostat or home assistant device), a gaming system, a media player, an e-book reader, a mobile television platform, an augmented reality device, a virtual reality device, a mixed reality device, an automobile navigation or infotainment system, or any other type of mobile, non-mobile, wearable device, and non-wearable device configured to receive input and provide output in accordance with techniques of this disclosure. Computing device 100 may implement various compute resources, such as processors, memory, data storage, data buses, input/output controllers, network interfaces, accelerators (e.g., graphics accelerators), and power management units.

Computing device 100 includes user interface device (UI device) 102. UI device 102 may function as an input and/or output device for computing device 100 and may be implemented using various technologies. For instance, UI device 102 may function as an input device using a presence-sensitive display, microphone technologies, infrared sensor technologies, or other input device technology for use in receiving user input. UI device 102 may function as an output device configured to present output to a user using any one or more display devices (e.g., the presence-sensitive display), speaker technologies, haptic feedback technologies, or other output device technology for use in outputting information to a user. In the example illustrated with respect to FIG. 1, UI device 102 displays graphical user interface (GUI) 130.

One or more communication components 104 of computing device 100 may communicate with external devices via one or more wired and/or wireless networks by transmitting and/or receiving network signals on the one or more networks. Examples of communication components 104 include a network interface card (e.g., an Ethernet card), an optical transceiver, a radio frequency transceiver, a global positioning system (GPS) receiver, or any other type of device that can send and/or receive information. Other examples of communication components 104 may include short wave radios, cellular data radios, wireless network radios, as well as universal serial bus (USB) controllers.

Processor 106 may implement functionality and/or execute instructions within computing device 100. For example, processor 106 may be a central processing unit (CPU), graphics processing unit (GPU), application processor (AP), digital signal processor (DSP), neural processing unit (NPU), image signal processor (ISP), or microcontroller unit (MCU). Processor 106 may implement computational components such as arithmetic logic units, control units, registers, pipelines, execution cores, caches (e.g., L1, L2, and L3), and branch predictors. Processor 106 may operate based on a fetch-decode-execute cycle, where processor 106 retrieves instructions from memory, decodes the instructions into operations, and executes the instructions via various functional units. Further, processor 106 may implement an instruction set that defines software and hardware communication at a binary level. In some implementations, processor 106 may include multiple cores and may support multiple threads, and may perform techniques such as parallel processing, graphics rendering, and multimedia processing.

Processor 106 may execute program code associated with operating system (OS) 114, applications 116, and/or text-prediction module 118. OS 114, applications 116, and text-prediction module 118 may perform operations described herein using software, hardware, firmware, or a mixture of hardware, software, and firmware residing in and/or executing at computing device 100 or processor 106. In some implementations, processor 106 may execute OS 114, applications 116, and text-prediction module 118 as virtual machines executing on underlying hardware, as one or more services of an operating system or computing platform, and/or as one or more executable programs at an application layer of processor 106.

Computing device 100 may write data to or read data from one or more storage components 112, where storage components 112 may include OS 114, applications 116, and text-prediction module 118. For example, storage components 112 may store execution code associated with OS 114, applications 116, and text-prediction module 118. Storage components 112 may include one or more hard disk drives, solid-state drives, hybrid drives, removable media drives, optical drives, and/or any other device configured to store information. In some implementations, storage components 112 may be configured for short-term storage of information as volatile memory and therefore may not retain stored contents if powered off. Examples of volatile memories include random access memory (RAM), dynamic random-access memory (DRAM), and static random-access memory (SRAM).

OS 114 manages hardware resources and may provide a platform for software execution at processor 106. OS 114 may perform scheduling algorithms (e.g., round-robin and multilevel queues), allocate memory via virtual memory management and paging mechanisms, and facilitate interprocess communication (IPC) via message queues, pipes, and shared memory. OS 114 may implement preemptive multitasking, real-time scheduling for deterministic latency, and dynamic power management to improve performance and power consumption of processor 106.

Applications 116 may be first-party, second-party, or third-party applications of computing device 100. Applications 116 may extend software functionality of processor 106, where applications 116 may execute within an execution environment presented by OS 114. Applications 116 may, as a few examples, provide gaming services (e.g., video games), email services, web browsing services, texting and/or chat services, web conferencing services, video conferencing services, music services (including streaming music services), video services (including video streaming services), navigation services, weather services, word processing services, spreadsheet services, slide and/or presentation services, assistant services, text entry services, network access services, or any other application service.

Computing device 100 may execute text-prediction module 118. Text-prediction module 118 may receive input from components of computing device 100, such as UI device 102. The input may include key-press input at UI device 102. Text-prediction module 118 may interpret the input to generate an output for display at UI device 102. For example, text-prediction module 118 may generate a character for display at UI device 102 based on receiving user input. As discussed with respect to FIG. 2, text-prediction module 118 may communicate with other components of computing device 100 (e.g., lexicon repository 220) to receive input and generate output.

As shown in FIG. 1, UI device 102 displays GUI 130, GUI 130 including character keys 150. Each character key of character keys 150 includes some characters of the English alphabet, such that character keys 150 include all characters of the English alphabet. Although GUI 130 includes four character keys, character key 150A, character key 150B, character key 150C, and character key 150D, other arrangements are contemplated. For example, GUI 130 may include eight character keys, where each character key of the eight character keys includes three or four characters of the English alphabet. In some implementations, character keys 150 may include some or all characters of a different alphabet, such as the Arabic alphabet. Additionally, or alternatively, character keys 150 may include punctuation marks, such as commas and periods.

According to various aspects of the present disclosure, computing device 100 may output GUI 130 for display by a presence-sensitive display of UI device 102. GUI 130 may include a graphical keyboard comprising multiple keys, including character keys 150. As shown in FIG. 1, GUI 130 may include other keys, such as a space key and/or a backspace key. In some implementations, character keys 150 include a set of characters, where all characters of the set of characters form only a complete alphabet of a writing system. For instance, character keys 150, as shown in FIG. 1, may include only a set of characters that form the English alphabet. In some implementations, character keys 150 may include alphanumeric characters of a writing system other than the English alphabet. For example, as discussed with respect to FIG. 8B, character keys 150 may include Greek characters. In still some implementations, character keys 150 may include punctuation and/or expression characters (e.g., pictographs and emotion icons). Expression characters may be referred to as "emojis".

Each character key of character keys 150 may be associated with the characters included by the respective key. In the example illustrated with respect to FIG. 1, character key 150A is associated with the characters 'Q', 'W', 'A', 'S', 'D', 'Z', and 'X'. Character key 150B is associated with the characters 'E', 'R', 'T', 'F', 'G', 'C', and 'V'. Character key 150C is associated with the characters 'Y', 'U', 'I', 'H', 'J', 'B', and 'N'. Character key 150D is associated with the characters 'O', 'P', 'K', 'L', and 'M'.

UI device 102 may receive user input indicating a character key of character keys 150. For example, UI device 102 may detect user input at a location of a presence-sensitive display, the location associated with a particular character key of character keys 150. Responsive to detecting the user input, UI device 102 may provide the user input to text-prediction module 118. In some examples, a user may tap on a presence-sensitive display of UI device 102. Specifically, the user may tap on character key 150A. Responsive to detecting the user input, UI device 102 may indicate to text-prediction module 118 that character key 150A has been selected. For instance, UI device 102 may transmit GUI coordinates to text-prediction module 118, the GUI coordinates associated with character key 150A. Additionally, or alternatively, UI device 102 may transmit a value to text-prediction module 118, the value associated with character key 150A.

Responsive to detecting the user input, computing device 100 may determine a character associated with the character key indicated by the user input. For example, if text-prediction module 118 receives an indication that character key 150C has been selected, text-prediction module 118 may determine a character associated with character key 150C. The character may be any of characters 'Y', 'U', 'I', 'H', 'J', 'B', or 'N'. To determine the character, text-prediction module 118 may implement text-prediction techniques (e.g., n-gram models, Markov models, recurrent neural networks, transformer models, and decoders).

Text-prediction module 118 may determine the character based on a selection likelihood associated with each character of the character key. For example, if text-prediction module 118 receives an indication that character key 150C has been selected, text-prediction module 118 may generate selection likelihood values associated with each of 'Y', 'U', 'I', 'H', 'J', 'B', and 'N'. Text-prediction module 118 may then select the character having the highest or lowest selection likelihood value. In this example, text-prediction module 118 may select the character 'I'.

After determining a character associated with the selected character key, computing device 100 may output the character for display within a text-editing region of GUI 130. For instance, UI device 102 may receive a task for displaying 'I', or some other character associated with the selected key, within text-editing region 132 of GUI 130. Responsive to receiving the task, UI device 102 may display the character at text-editing region 132.

By displaying a complete alphabet within two to eight character keys, computing device 100 may receive user input using a relatively small display size. For instance, computing device 100 may be a watch having a presence-sensitive display. The watch, needing to fit on a user's wrist, has a small display size. Therefore, each character of the display cannot be associated with an individual key without each key being too small for a user to easily select. The user may struggle to see the small individual keys and is likely to miss-select keys when inputting text. According to aspects of the present disclosure, the watch can instead display a keyboard having multi-character keys. These multi-character keys are larger than individual-character keys, allowing the user to quickly and reliably input text.

Additionally, confining a complete alphabet to multi-character keys enables computing device 100 to display keys that UI device 102 may otherwise lack room for on a display. For instance, a watch implementing aspects of the present disclosure may have additional display space for a back-space key, volume key, expression key, etc., Furthermore, because a user may use the multi-character keys to quickly input text, UI device 102 may sooner enter a low-battery state (e.g., by dimming or turning off a display). Over time, computing device 100 may incur substantial power savings due to the time saved by the multi-character keys.

Figure 2:
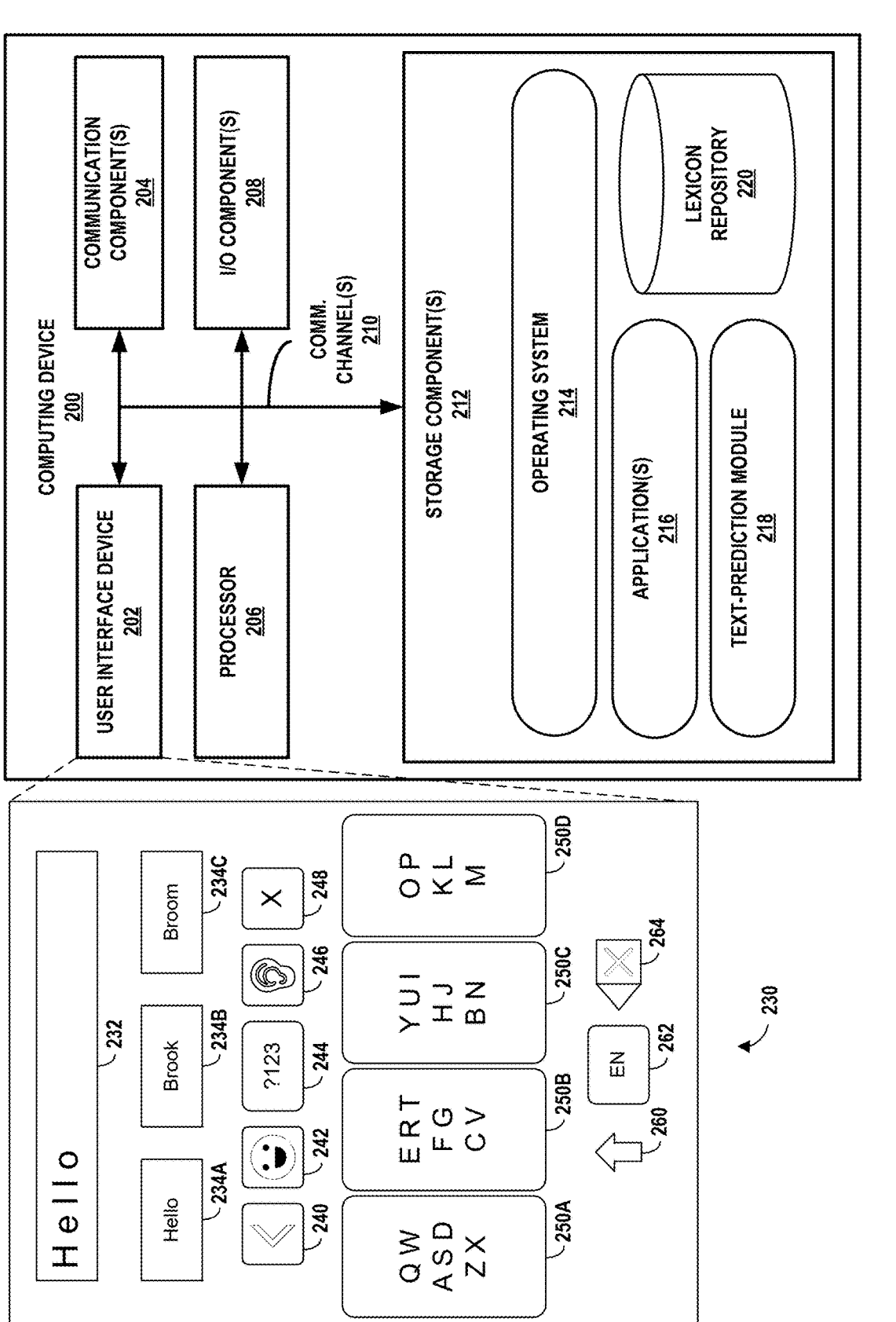
FIG. 2 is a conceptual diagram illustrating another example computing device for receiving input and providing output via a presence-sensitive display, in accordance with one or more techniques of this disclosure.

FIG. 2 is a conceptual diagram illustrating another example computing device for receiving input and providing output via a presence-sensitive display, in accordance with one or more techniques of this disclosure. As shown in FIG. 2, computing device 200 includes UI device 202.

UI device 202 may function as an input and/or output device for computing device 200 and may be implemented using various technologies. For instance, UI device 202 may function as an input device using a presence-sensitive display, microphone technologies, infrared sensor technologies, or other input device technology for use in receiving user input. UI device 202 may function as an output device configured to present output to a user using any one or more display devices (e.g., a presence-sensitive display), speaker technologies, haptic feedback technologies, or other output device technology for use in outputting information to a user. In some implementations, UI device 202 may be a component of input/output (I/O) components 208. In the example illustrated with respect to FIG. 2, UI device 202 displays GUI 230.

One or more communication components 204 of computing device 200 may communicate with external devices via one or more wired and/or wireless networks by transmitting and/or receiving network signals on the one or more networks. Examples of communication components 204 include network interface cards (e.g., Ethernet cards), optical transceivers, radio frequency transceivers, GPS receivers, or any other type of device that can send and/or receive information. Other examples of communication components 204 may include short wave radios, cellular data radios, wireless network radios, as well as USB controllers.

Processor 206 may implement functionality and/or execute instructions within computing device 200. For example, processor 206 may be a CPU, GPU, AP, DSP, NPU, ISP, or MCU. Processor 206 may implement computational components such as arithmetic logic units, control units, registers, pipelines, execution cores, caches (e.g., L1, L2, and L3), and branch predictors. Processor 206 may operate based on a fetch-decode-execute cycle, where processor 206 retrieves instructions from memory, decodes the instructions into operations, and executes the instructions via various functional units. Further, processor 206 may implement an instruction set that defines software and hardware communication at a binary level. In some implementations, processor 206 may include multiple cores and may support multiple threads, and may perform techniques such as parallel processing, graphics rendering, and multimedia processing.

One or more I/O components 208 may receive input and/or provide output for computing device 200. I/O components 208 may provide output by, for example, making information perceivable to an external component or user. I/O components 208 may convert data produced by computing device 200 into a user-understandable or machine-interpretable format, such as a visual, audio, or physical format. Examples of output components of I/O components 208 include audio output devices (e.g., speakers and headphones), haptic output devices, printers, actuators, network interfaces, and storage devices. I/O components 208 may also provide input for computing device 200 by, for example, converting external signals into machine-readable formats. Examples of input components of I/O components 208 include game controllers, audio input devices (e.g., microphones), image input devices (e.g., cameras and scanners), thermometers, accelerometers, motion detectors, biometric devices, network interfaces, rotating crown buttons, push buttons, and storage devices.

Communication channels 210 may interconnect each of UI device 202, communication components 204, processor 206, I/O components 208, and storage components 212 for inter-component communication (physically, communicatively, and/or operatively). In some examples, communication channels 210 may include a system bus, a network connection, an inter-process communication data structure, or any other method for communicating data.

Computing device 200 may write data to or read data from one or more storage components 212, where storage components 212 may include OS 214, applications 216, text-prediction module 218, and lexicon repository 220. For example, storage components 212 may store execution code and/or other data associated with OS 214, applications 216, text-prediction module 218, and lexicon repository 220. Storage components 212 may include one or more hard disk drives, solid-state drives, hybrid drives, removable media drives, optical drives, and/or any other device configured to store information. In some implementations, storage components 212 may be configured for short-term storage of information as volatile memory and therefore may not retain stored contents if powered off. Examples of volatile memories include RAM, DRAM, and SRAM.

Processor 206 may execute program code associated with one or more of OS 214, applications 216, and text-prediction module 218. OS 214, applications 216, and text-prediction module 218 may perform operations described herein using software, hardware, firmware, or a mixture of hardware, software, and firmware residing in and/or executing at computing device 200 or processor 206. In some implementations, processor 206 may execute OS 214, applications 216, and text-prediction module 218 as virtual machines executing on underlying hardware, as one or more services of an operating system or computing platform, and/or as one or more executable programs at an application layer of processor 206.

OS 214 manages hardware resources and may provide a platform for software execution at processor 206. OS 214 may perform scheduling algorithms (e.g., round-robin and multilevel queues), allocate memory via virtual memory management and paging mechanisms, and facilitate IPC via message queues, pipes, and shared memory. OS 214 may implement preemptive multitasking, real-time scheduling for deterministic latency, and dynamic power management to improve performance and power consumption of processor 206.

Applications 216 may be first-party, second-party, or third-party applications of computing device 200. Applications 216 may extend software functionality of processor 206, where applications 216 may execute within an execution environment presented by OS 214. Applications 216 may, as a few examples, provide gaming services (e.g., video games), email services, web browsing services, texting and/or chat services, web conferencing services, video conferencing services, music services (including streaming music services), video services (including video streaming services), navigation services, weather services, word processing services, spreadsheet services, slide and/or presentation services, assistant services, text entry services, network access services, or any other application service.

Processor 206 may execute text-prediction module 218. Text-prediction module 218 may be a software component for generating or suggesting text (e.g., phrase, word, subword, or character). In some implementations, text-prediction module 218 uses autoregressive decoding, where text is predicted based on a prior context and encoded as hidden states or attention representations. Text-prediction module 218 may also implement techniques such as greedy decoding, beam search improvement, token masking, or top-k sampling to maintain output variability and consistency. Text-prediction module 218 may implement probabilistic models and/or neural architectures, and may predict text based on words, phrases, and/or characters included in a lexicon (e.g., a dictionary) stored at lexicon repository 220.

Lexicon repository 220 may include one or more lexicons. In some examples, a lexicon may include a listing of words and may include additional information about the listed words. A lexicon may be represented by one or more data structures, such as by one or more of an array, a list, a tree, or other data structures. For example, lexicon repository 220 may include a lexicon stored in a trie data structure. A lexicon trie data structure may include two or more nodes. Each node of the lexicon trie may represent a letter. The first node in a lexicon trie may be considered an entry node, which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate word) included in the lexicon. The letters indicated by the nodes along a path of nodes from the entry node to a terminal node may spell out a word indicated by the terminal node. In some examples, lexicon repository 220 may be a default dictionary installed on computing device 200. In certain examples, lexicon repository 220 may include a group of predefined phrases installed on computing device 200. In other examples, lexicon repository 220 may include multiple sources of lexicons, which may be stored at computing device 200 or stored at one or more remote computing devices that are accessible to computing device 200 via one or more communication channels.

In some examples, text-prediction module 218 may be implemented in the firmware of computing device 200. Text-prediction module 218 and/or lexicon repository 220 may include language model frequency information such as n-gram language models. An n-gram language model may provide a probability distribution for an item xi (letter, word, punctuation character or other delimiter) in a contiguous sequence of items based on the previous items in the sequence (i.e., $P(x_i | x_{i-(n-1)}, \ldots, x_i-1)$). For instance, a bigram language model (an n-gram model where n=2) of text-prediction module 218, may provide a probability that the character 'w' follows the sequence of letters "no".

As shown in FIG. 2, UI device 202 displays GUI 230, GUI 230 including various graphical elements. Text-editing region 232 may display characters output by text-prediction module 218. For example, after receiving a sequence of character key inputs, UI device 202 may output "Hello" for display at text-editing region 232. Alternative suggestions may be displayed at a word-suggestion region comprising subregions 234A, 234B, and 234C. For example, a user may select character keys of GUI 230 in the following sequence: 250C, 250B, 250D, 250D, and 250D. Based on this sequence, text-prediction module 218 may output predicted words (e.g., suggested words) "Hello", "Brook", and "Broom", where each predicted word may be associated with a certainty value. Subregions 234A, 234B, and 234C may display the predicted words based on the certainty value associated with each predicted word. For example, subregion 234A may display the predicted word associated with the highest or lowest certainty value, subregion 234B may display the predicted word associated with the second highest or second lowest certainty value, and subregion 234C may display the predicted word associated with the third highest or third lowest certainty value. The predicted word associated with the highest or lowest certainty value may also be displayed by text-editing region 232.

Various keys may enable functionality of computing device 200. In the example illustrated with respect to FIG. 2, arrow key 240 may hide or unhide other UI elements of GUI 230. Expression key 242 may be used to expand an expression overlay at GUI 230, the expression overlay including various expression characters (e.g., pictographs and/or emotion icons) for selection by a user. Alternative key 244 may be used to display characters for selection that are not otherwise displayed by character keys 250, such as punctuation characters and numerical characters. Audio key 246 may enable or disable audio input or output of I/O components 208. Exit key 248 may be used to cancel user input. Case key 260 may be used to transition characters of character keys 250 between uppercase and lowercase characters. Space key 262 may be used to indicate whitespace or confirm user input. Backspace key 264 may be used to remove a focused character or a final character displayed at text-editing region 232.

In the example shown with respect to FIG. 2, each character key of character keys 250 includes some characters of the English alphabet, such that character keys 250 include all characters of the English alphabet. Although GUI 230 includes four character keys, character key 250A, character key 250B, character key 250C, and character key 250D, other arrangements are contemplated. For example, GUI 230 may include eight character keys, where each character key of the eight character keys includes three or four characters of the English alphabet. In some implementations, character keys 250 may include some or all characters of a different alphabet, such as the Greek alphabet. Additionally, or alternatively, character keys 250 may include punctuation marks and numerical characters.

As discussed with respect to FIG. 1, computing device 200 may receive a first user input at a location of a presence-sensitive display of UI device 202. Computing device 200 may determine a first character associated with the first user input and may output the first character at text-editing region 232. According to various aspects of the present disclosure, computing device 200 may receive a second user input at a second location of the presence-sensitive display associated with a second particular character key of character keys 250. The second user input may indicate a subsequent character key of character keys 250. For example, the first user input may indicate character key 250C and the second user input may indicate character key 250B.

After receiving the second user input, computing device 200 may output a second character for display within text-editing region 232. The second character may be associated with the character key indicated by the second user input. For example, a first user input may indicate character key 250C and a second user input may indicate character key 250B. After the first user input, computing device 200 may output any one of characters 'Y', 'U', 'I', 'H', 'J', 'B', or 'N' for display at text-editing region 232. In this example, text-prediction module 218 may indicate that 'I' has the lowest or highest certainty value, and UI device 202 may therefore display 'I' after receiving the first user input. After receiving the second user input indicating character key 250B, computing device 200 may redetermine output for text-editing region 232. For instance, computing device 200 may output any one of characters 'Y', 'U', 'I', 'H', 'J', 'B', or 'N' followed by any one of characters 'E', 'R', 'T', 'F', 'G', 'C', or 'V' for display at text-editing region 232. In this example, text-prediction module 218 may determine that "He" has the lowest or highest certainty value, and UI device 202 may therefore display "He" within text-editing region 232 after receiving the second user input.

As discussed, computing device 200 may, in response to receiving a second user input associated with character keys 250, determine suggested text (e.g., one or more characters) comprising a character associated with the first input key followed by a character associated with the second input key. The suggested text may represent a candidate word included in lexicon repository 220. For example, after a first input selects character key 250A and a second input selects character key 250A, text-prediction module 218 may output the suggested text "As" for display at text-editing region 232. In some implementations, computing device 200 may predict and display two or more characters for one or more received inputs. For example, after a first input selects character key 250A, text-prediction module 218 may output the suggested text "an" for display within text-editing region 232. After a first input selects character key 250A and a second input selects character key 250A, text-prediction module 218 may output the suggested text "sat" for display within text-editing region 232.

In some implementations, computing device 200 may determine a set of suggested words in response to receiving user input. The user input may indicate a particular character key of character keys 250. Each suggested word of the set of suggested words may comprise a character associated with the particular character key followed by a string of a set of predicted characters such that each suggested word represents a candidate word included in a lexicon of lexicon repository 220. For example, if computing device 200 receives an input indicating character key 250C, text-prediction module 218 may determine a set of suggested words that begin with one of 'Y', 'U', 'I', 'H', 'J', 'B', or 'N'. In this example, the set of suggested words may include "Happy", "Nag", and "Jail". Text-prediction module 218 may then output the set of suggested words for display within a word-suggestion region comprising subregions 234.

In some implementations, text-prediction module 218 may generate suggested texts and suggested words by, in part, disregarding whether the characters displayed by character keys 250 are in an uppercase or lowercase format. For instance, if computing device 200 receives an input indicating character key 250C, where character key 250C displays 'y', 'u', 'i', 'h', 'j', 'b', and 'n', text-prediction module 218 may generate suggested words "Hello", "Brook", and "Broom" for display in a word-suggestion region of GUI 230.

Computing device 200 may receive a selection input indicating a selected word of the set of suggested words. For example, a user may select "Brook" by selecting subregion 234B. In response to receiving the selection input, computing device 200 may output the selected word for display within text-editing region 232. In this example, responsive to receiving the selection associated with subregion 234B, UI device 202 may output "Brook" instead of "Hello" at text-editing region 232.

Computing device 200 may redetermine the set of suggested words in response to receiving additional input. As discussed, UI device 202 may display a set of suggested words within subregions 234. Text-prediction module 218 may determine a subsequent set of suggested words in response to receiving additional user input. Each suggested word may comprise a character associated with a first user input followed by a character associated with a subsequent user input, followed by a string of a set of predicted characters. For example, computing device 200 may receive an input selecting character key 250D. In response, computing device 200 may output a set of suggested words, where each suggested word begins with one of 'O', 'P', 'K', 'L', or 'M'. Computing device 200 may then receive a second input selecting character key 250A. In response, computing device 200 may output a subsequent set of suggested words, where each suggested word begins with one of 'O', 'P', 'K', 'L', or 'M' followed by one of 'Q', 'W', 'A', 'S', 'D', 'Z', or 'X' followed by additional characters such that each suggested word represents a candidate word included in a lexicon of lexicon repository 220. Computing device 200 may display one or more of the suggested words of the subsequent set of suggested words via UI device 202.

In some implementations, computing device 200 may detect a sequence of user inputs at respective locations of a presence-sensitive display, where a sequence of character keys of character keys 250 is associated with each user input of the sequence of user inputs. For example, computing device 200 may detect inputs associated with the following sequence of character keys: character key 250C, character key 250B, character key 250D, character key 250D, and character key 250D.

Responsive to computing device 200 detecting the sequence of user inputs, text-prediction module 218 may determine suggested text based on the sequence of user inputs. The suggested text may include a sequence of predicted characters, where each predicted character is determined based on both an associated character key of the sequence of character keys and a respective order of the associated character key in the sequence of character keys, such that the suggested text represents a candidate word included in a lexicon of lexicon repository 220. For example, computing device 200 may detect user inputs associated with the following sequence of character keys: character key 250C, character key 250B, character key 250D, character key 250D, and character key 250D. In response, text-prediction module 218 may output suggested text beginning with one of 'Y', 'U', 'I', 'H', 'J', 'B', or 'N' followed by one of 'E', 'R', 'T', 'F', 'G', 'C', or 'V' followed by one of 'O', 'P', 'K', 'L', or 'M' followed by one of 'O', 'P', 'K', 'L', or 'M' followed by one of 'O', 'P', 'K', 'L', or 'M'. In this example, the suggested text may be "Hello". Computing device 200 may output the suggested text for display within text-editing region 232.

In some implementations, UI device 202 may detect a continuous gesture input indicating locations of a sequence of characters from one or more character keys 250. In response, text-prediction module 218 may determine a set of suggested words. Each suggested word may be a candidate word of a lexicon that includes a sequence of predicted characters, the sequence of predicted characters being a subsequence of the sequence of characters. For example, a user may slide or hover their finger over a presence-sensitive display to cross letters of a word, e.g., 'S', 'A', 'S' and 'D'. From this sequence of characters, text-prediction module 218 may output "sad" and "ad" as suggested words. In some implementations, text-prediction module 218 may duplicate characters in a sequence to match candidate words. For instance, a user may slide or hover their finger over a presence-sensitive display to cross a sequence of characters including 'h', 'e,' 'l', and 'o'. From this sequence, text-prediction module 218 may output "Hello" as a subsequence. In still some implementations, text-prediction module 218 may determine one or more suggested words by providing the sequence of characters or the locations to a language model of text-prediction module 218, where the language model outputs the one or more suggested words. UI device 202 may then output the suggested words for display. To enable gesture typing and/or other techniques of this disclosure, text-prediction module 218 may be configured with location information of individual characters of GUI 230, e.g., information indicating the location of each character of GUI 230 on a presence-sensitive display.

Figure 3:
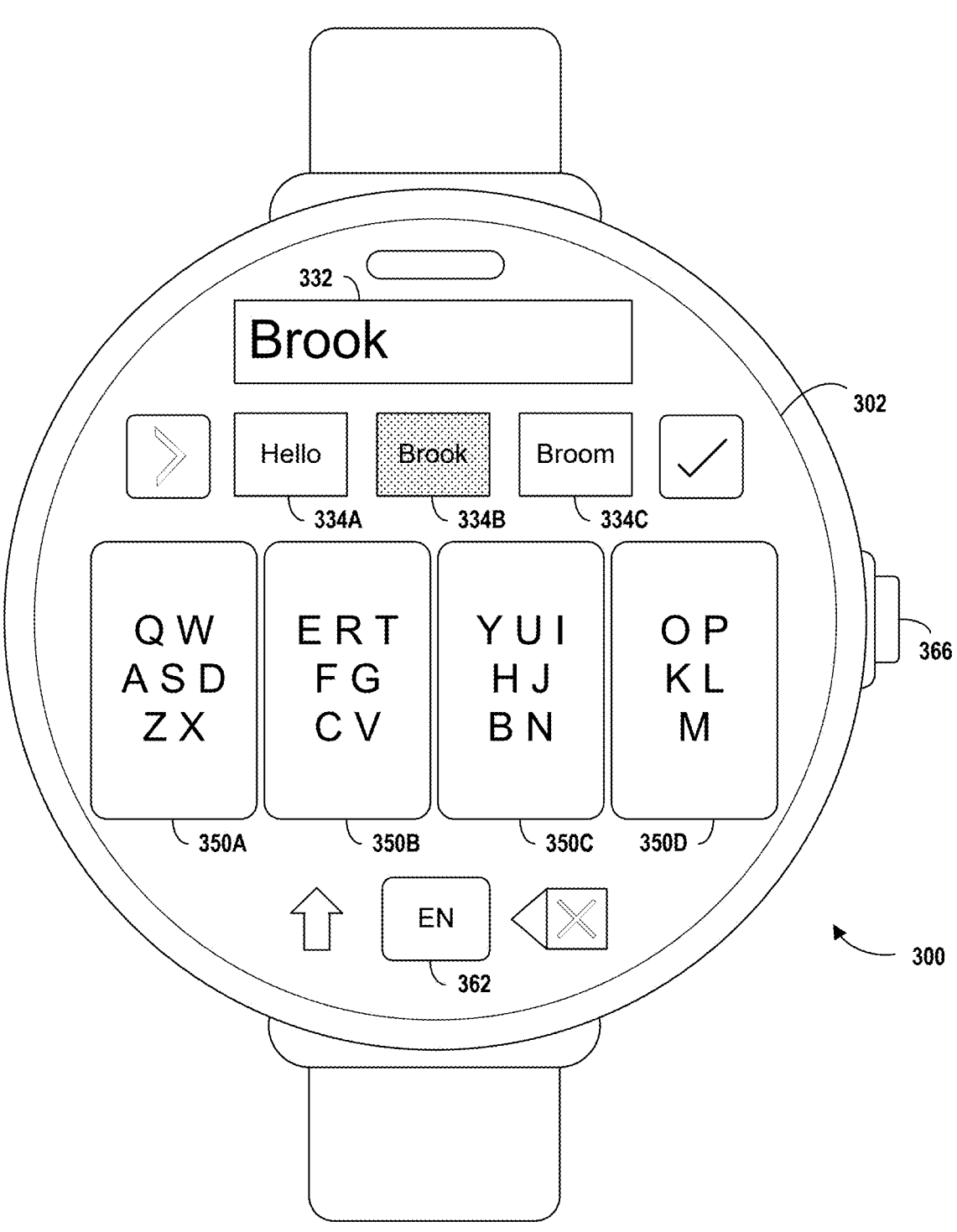
FIG. 3 is a conceptual diagram illustrating a graphical user interface (GUI) for a presence-sensitive display of a wearable device, the GUI having multi-character keys, in accordance with one or more techniques of this disclosure.

FIG. 3 is a conceptual diagram illustrating a GUI for a presence-sensitive display of a wearable device, the GUI having multi-character keys, in accordance with one or more techniques of this disclosure. As shown in FIG. 3, wearable device 300 may receive input via presence-sensitive display 302 and rotating crown button 366. Presence-sensitive display 302 displays a GUI including text-editing region 332, subregions 334, character keys 350, and space key 362. Subregion 334B is in a focused state in that subregion 334B is graphically differentiated from subregion 334A, subregion 334C, and text-editing region 332.

As shown with respect to FIG. 3, a focus region may indicate whether graphical elements are in a focused state. In FIG. 3, a focus region overlaps subregion 334B. The focus region may additionally or alternatively overlap other graphical elements, such as subregion 334A, subregion 334C, and/or individual characters displayed at text-editing region 332. Rotating crown button 366 may be implemented to transition graphical elements in and out of focused states. For example, rotating crown button 366 may receive a clockwise transition input. In response, wearable device 300 may transition subregion 334B out of a focused state and subregion 334A into a focused state. Additionally, or alternatively, rotating crown button 366 may receive a counterclockwise transition input. In response, wearable device 300 may transition subregion 334B out of a focused state and subregion 334C into a focused state. Transitioning graphical elements in and out of focused states based on user input is further discussed with respect to FIG. 4 and FIG. 5.

In some implementations, computing device 300 may display a suggested word in text-editing region 332 based on the suggested word being indicated by a focus region. For instance, computing device 300 may receive transition input via rotating crown button 366 and, in response, may transition a focus region from subregion 334B to 334C. Computing device 300 may then change text-editing region 332 to display "Broom" instead of "Brook." In still some implementations, computing device 300 may display a suggested word in text-editing region 332 based on the suggested word being indicated by a focus region and computing device 300 receiving a selection input. For example, computing device 300 may receive transition input via rotating crown button 366 and, in response, may transition a focus region from subregion 334B to 334C. Then, computing device 300 may receive selection input via a button or other input device of computing device 300. In response to receiving the selection input, computing device 300 may change text-editing region 332 to display "Broom" instead of "Brook."

As discussed, wearable device 300 may output a set of suggested words (e.g., words or characters) for display within subregions 334. Wearable device 300 may also output a set of suggested texts (e.g., words or characters) for display within text-editing region 332. In some implementations, wearable device 300 may include functionality to transition a focus region between individual words and/or individual characters. For example, wearable device 300 may output suggested text for display within text-editing region 332, the suggested text including a set of characters, wherein a focus region indicates an initial character of the set of characters. For instance, a focus region may graphically differentiate the 'B' character in "Brook" at text-editing region 332. Wearable device 300 may receive transition input from an input device (e.g., rotating crown button 366), where the transition input indicates a direction. Responsive to receiving the transition input, wearable device 300 may transition the focus region to indicate a subsequent character of the set of characters or a suggested word of the set of suggested words, wherein transitioning the focus region is based on the direction. For example, if the focus region overlapped 'B' in text-editing region 332, wearable device 300 may transition the focus region to instead overlap 'r' in text-editing region 332 or "Broom" in subregion 334C. Wearable device 300 may transition the focus region by graphically differentiating a first graphical element while no longer graphically differentiating a second graphical element.

In some implementations, transition input may be provided by structures other than rotating crown button 366. For example, wearable device 300 may include push buttons. The push buttons may be used to provide transition input, confirm character selection, select GUI elements, and to navigate the GUI. Additionally, or alternatively, presence-sensitive display 302 may be used to provide transition input, confirm character selection, select GUI elements, and to navigate the GUI. Further, space key 362 or some other key displayed by presence-sensitive display 302 may be used to select graphical elements indicated by a focus region.

Figure 4:
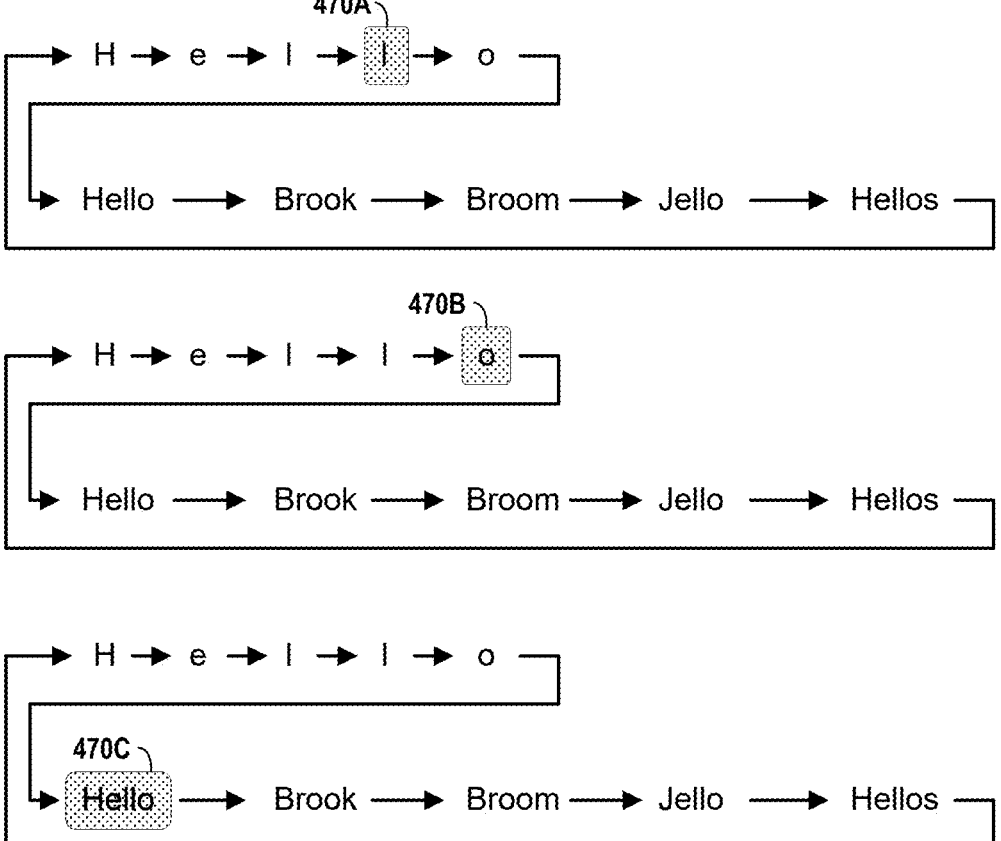
FIG. 4 is a conceptual diagram illustrating focus region progression in response to forward transition input, in accordance with one or more techniques of this disclosure.

FIG. 4 is a conceptual diagram illustrating focus region progression in response to forward transition input, in accordance with one or more techniques of this disclosure. FIG. 4 may be discussed with respect to FIG. 3 for example purposes only. In some implementations, a user may provide forward transition input by moving rotating crown button 366 in an upward (e.g., clockwise) direction. Additionally, or alternatively, a user may provide forward transition input by moving rotating crown button 366 in a downward (e.g., counter-clockwise) direction. In still some implementations, wearable device 300 may receive input such as forward transition input via other input structures, e.g., those discussed with respect to I/O components 208.

As shown with respect to FIG. 4, focus region 470A indicates that the 'l' of "Hello" is in a focused state. After receiving forward transition input, wearable device 300 may display focus region 470B instead of focus region 470A. Because focus region 470B overlaps the final character of "Hello" (e.g., the final suggested text displayed at text-editing region 332), additional forward transition input may cause wearable device 300 to put one or more of subregions 334 in a focused state. For example, after receiving additional forward transition input, wearable device 300 may display focus region 470C instead of focus region 470B.

Figure 5:
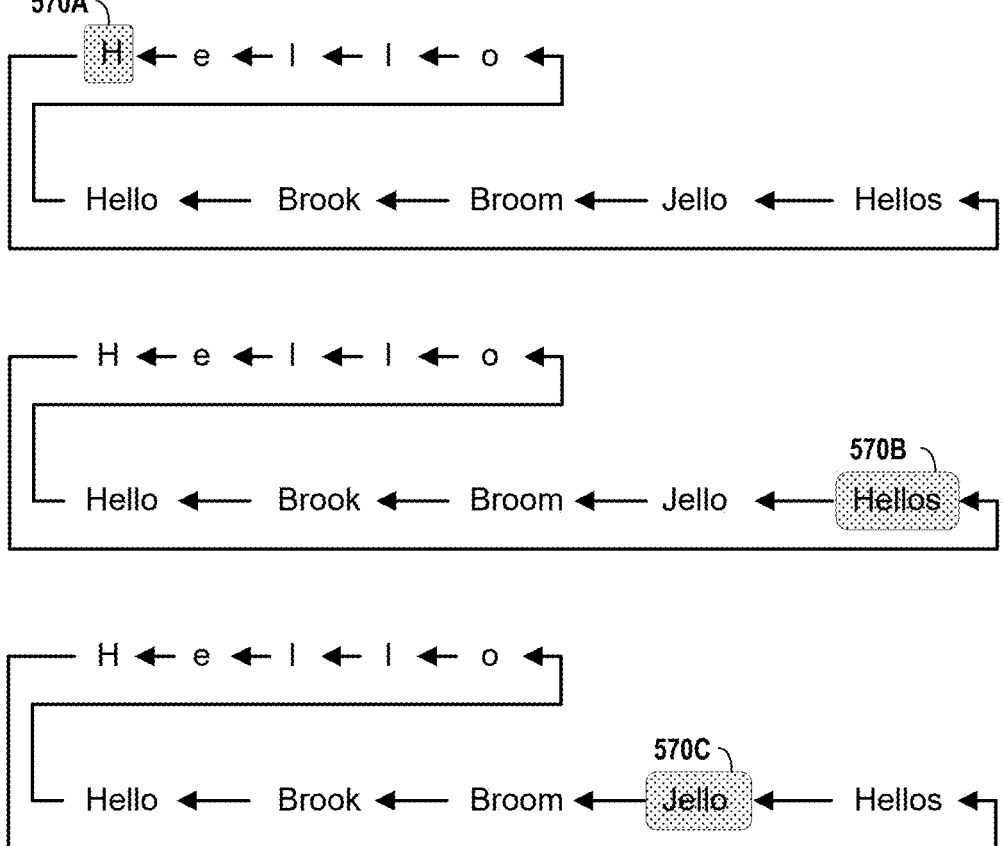
FIG. 5 is a conceptual diagram illustrating focus region progression in response to backward transition input, in accordance with one or more techniques of this disclosure.

FIG. 5 is a conceptual diagram illustrating focus region progression in response to backward transition input, in accordance with one or more techniques of this disclosure. FIG. 5 may be discussed with respect to FIG. 3 for example purposes only. In some implementations, a user may provide backward transition input by moving rotating crown button 366 in an upward (e.g., clockwise) direction. Additionally, or alternatively, a user may provide backward transition input by moving rotating crown button 366 in a downward (e.g., counter-clockwise) direction. In still some implementations, wearable device 300 may receive input such as backward transition input via other input structures, e.g., those discussed with respect to I/O components 208.

As shown with respect to FIG. 5, focus region 570A indicates that the 'H' of "Hello" is in a focused state. Because focus region 570A overlaps the first character of "Hello" (e.g., the first suggested text displayed at text-editing region 332), backward transition input may cause wearable device 300 to put one or more of subregions 334 in a focused state. For example, after receiving backward transition input, wearable device 300 may display focus region 570B instead of focus region 570A. After receiving additional backward transition input, wearable device 300 may display focus region 570C instead of focus region 570B.

Figure 6:
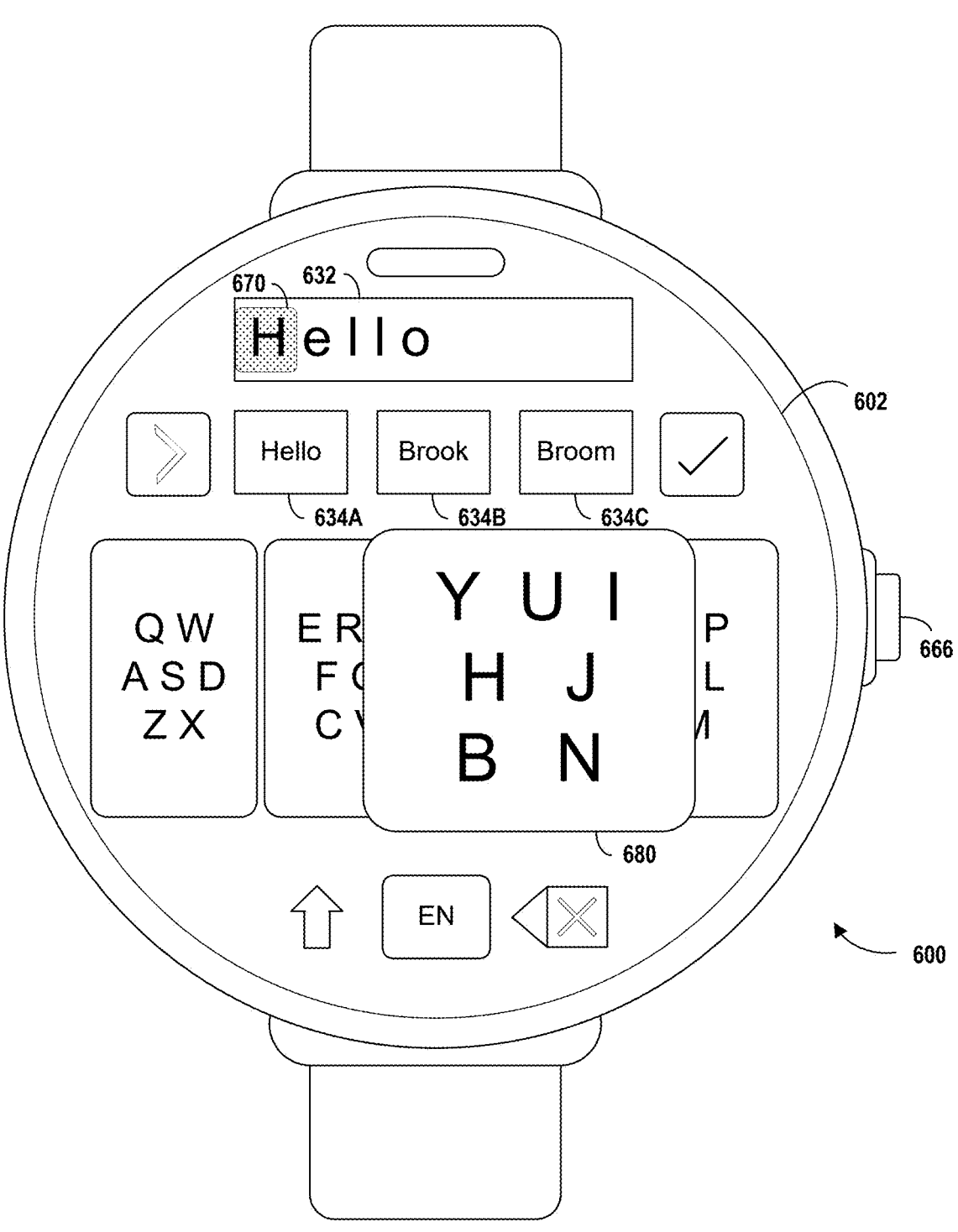
FIG. 6 is a conceptual diagram illustrating a first GUI overlay for a presence-sensitive display of a wearable device, in accordance with one or more techniques of this disclosure.

FIG. 6 is a conceptual diagram illustrating a GUI overlay for a presence-sensitive display of a wearable device, in accordance with one or more techniques of this disclosure. As shown in FIG. 6, wearable device 600 includes rotating crown button 666 and presence-sensitive display 602. Focus region 670 overlaps the 'H' character of text-editing region 632. Subregions 634 include suggested words "Hello", "Brook", and "Broom". Overlay 680 displays characters for replacing the character indicated by focus region 670.

In some implementations, wearable device 600 outputs suggested text for display within text-editing region 632. The suggested text includes a set of characters, where a focus region indicates an initial character of the set of characters. In some implementations, the initial character may be a beginning character of text displayed at text-editing region 632. For example, as shown in FIG. 6, focus region 670 indicates 'H' of "Hello" at text-editing region 632. In some implementations, the initial character may be a character indicated by a cursor. For example, a user may set a cursor position by tapping presence-sensitive display 602. The user may set the cursor position within text-editing region 632 by tapping a location corresponding to text-editing region 632 on presence-sensitive display 602. For instance, the user may tap 'e' to indicate 'e' via the cursor. In this example, the focus region may indicate 'e' as an initial character and, responsive to receiving transition input, wearable device 600 may transition the focus region to instead indicate a subsequent character, the subsequent character being 'H' or 'l'.

Focus region 670 may be associated with text-editing functionality. For example, wearable device 600 may output an overlay for display at a location of a GUI displayed by presence-sensitive display 602. The overlay may comprise a set of overlay characters, where each character of the set of overlay characters is associated with the initial character. In the example shown with respect to FIG. 6, wearable device 600 outputs overlay 680. Overlay 680 comprises the set of characters that share a character key with the character indicated by focus region 670.

Wearable device 600 may receive an overlay input, where the overlap input indicates a chosen character of the set of overlay characters. For instance, a user may tap on one of the characters displayed by overlay 680. Additionally, or alternatively, the user may navigate to and select one of the characters via rotating crown button 666. Wearable device 600 may then output the chosen character for display within focus region 670, such that the chosen character replaces the initial character 'H'. For example, a user may select 'l' via overlay 680. In this example, because 'H' is replaced with 'l' in text-editing region 632, wearable device 600 may determine new suggested texts and suggested words for display within text-editing region 632 and/or subregions 634, each suggested text and suggested word beginning with 'l'. The new suggested texts and/or suggested words may also be based on previous character key inputs. For example, wearable device 600 may replace one or more of the characters 'e', 'l', 'l', and 'o' with characters sharing a character key with the replaced character. In response to receiving the chosen character, wearable device 600 may then transition focus region 670 such that focus region 670 overlaps the second character within text-editing region 632 instead of the first character. Once wearable device 600 transitions focus region 670 to a subsequent character, wearable device 600 may update overlay 680 to display characters associated with the subsequent character, e.g., characters sharing a character key with the subsequent character.

In some examples, wearable device 600 may update text-editing region 632 to include a suggested word displayed by a subregion of subregions 634. For instance, if focus region 670 transitions from 'H' to "Broom", wearable device 600 may update text-editing region 632 to display "Broom" instead of "Hello". Additionally, some suggested words may be in a non-displayed state until focus region 670 transitions to the non-displayed suggested word. For example, if a focus region overlaps subregion 634C, and wearable device 600 receives transition input, wearable device 600 may update a GUI displayed by presence-sensitive display 602 to produce a scrolling effect. In this example, subregion 634A may be updated to display "Brook", subregion 634B may be updated to display "Broom", and subregion 634C may be updated to display a previously non-displayed suggested word, such as "Jello". If the focus region transitions past a final suggested word of a set of suggested words, wearable device 600 may update subregion 634A and text-editing region 632 to include a first suggested word of the set of suggested words, where the focus region transitions to overlap a first character displayed by text-editing region 632.

Figure 7:
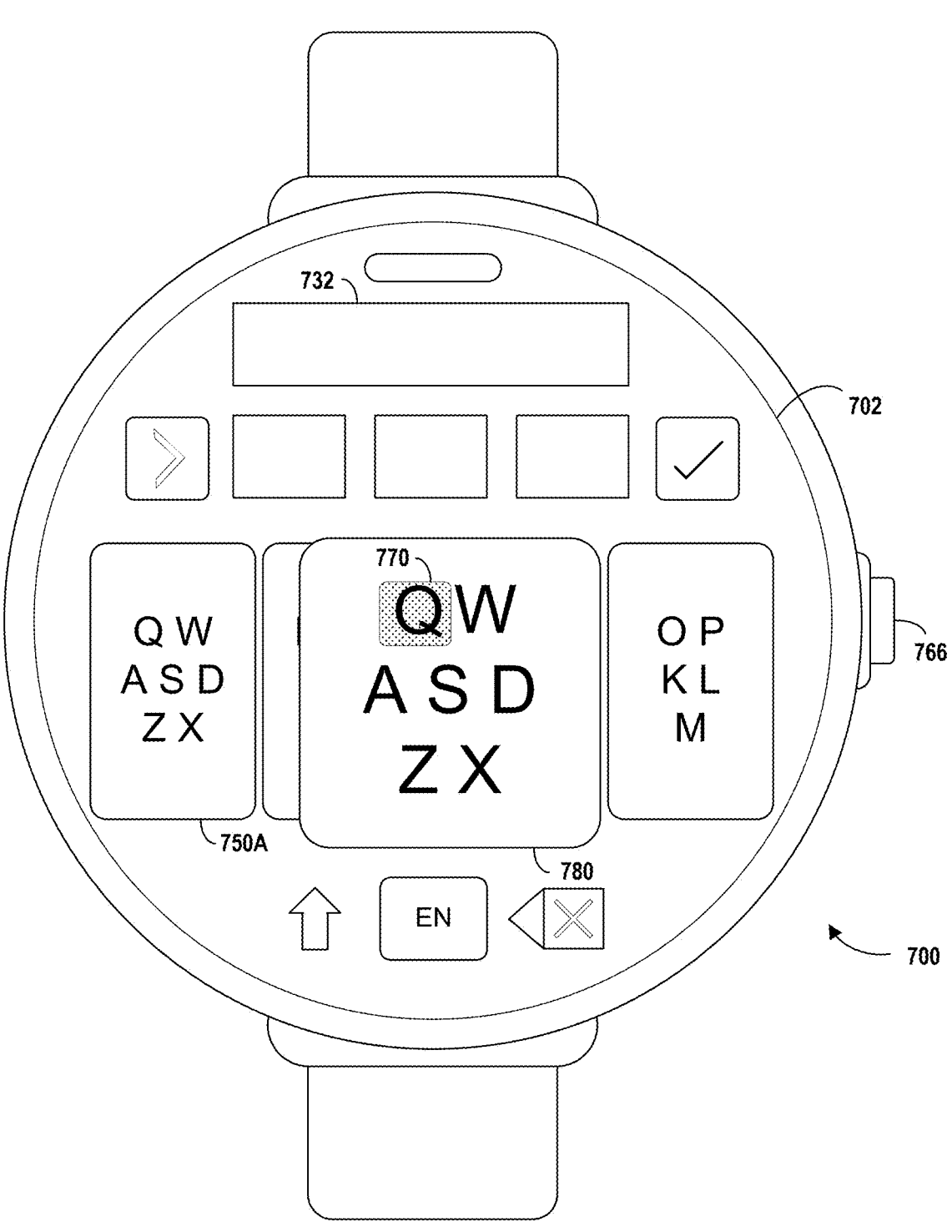
FIG. 7 is a conceptual diagram illustrating a second GUI overlay for a presence-sensitive display of a wearable device, in accordance with one or more techniques of this disclosure.

FIG. 7 is a conceptual diagram illustrating a second GUI overlay for a presence-sensitive display of a wearable device, in accordance with one or more techniques of this disclosure. As shown in FIG. 7, wearable device 700 includes rotating crown button 766 and presence-sensitive display 702. Focus region 770 overlaps the 'Q' character of overlay 780.

In some implementations, wearable device 700 may support long-press input (e.g., letter-level input) via presence-sensitive display 702. For example, a user may select character key 750A by holding a finger or stylus against character key 750A. If the user holds a key for a threshold amount of time (e.g., half a second or a whole second), wearable device 700 may receive a long-press input associated with the held key. In some examples, wearable device 700 may receive a long-press input at a location of presence-sensitive display 702, where the long-press input indicates a character key. In response to receiving the long-press input, wearable device 700 may output an overlay (e.g., overlay 780) for display via presence-sensitive display 702. The overlay may include a set of overlay characters, where each overlay character is associated with the character key indicated by the long-press input. In the example shown with respect to FIG. 7, a long-press input indicates character key 750A. In response, wearable device 700 displays overlay 780, where overlay 780 includes characters associated with character key 750A.

Wearable device 700 may receive an overlay input indicating a chosen character of the set of overlay characters. For example, a user may tap one of the overlay characters on presence-sensitive display 702. Additionally, or alternatively, a user may rotate rotating crown button 766 to cause focus region 770 to transition throughout the overlay characters of overlay 780. Once focus region 770 overlaps a desired character, the user may press a button of wearable device 700 to provide the overlay input that indicates a chosen character. After receiving the overlay input, wearable device 700 may output the chosen character for display within text-editing region 732.

Additionally, wearable device 700 may generate predicted words for display within text-editing region 732 or a word-suggestion region, where the predicted words are based on the chosen overlay character. In some examples, wearable device 700 may determine a set of suggested words in response to receiving overlay input. The set of suggested words may comprise a character selected via the overlay input followed by a string of a set of predicted characters, such that each suggested word represents a candidate word included in a lexicon. For example, if the selected character is 'A', wearable device 700 may determine a set of predicted words that begin with 'A', such as "Apple" or "Ant". Wearable device 700 may then output the set of suggested words for display via presence-sensitive display 702.

Figure 8A:
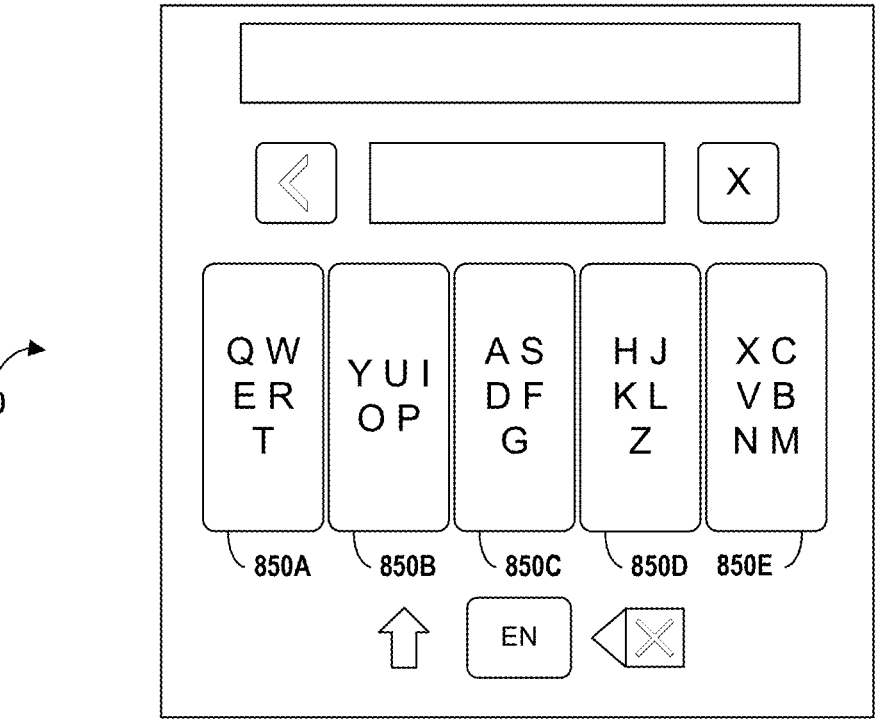
FIG. 8A is a conceptual diagram illustrating a GUI having five character keys, in accordance with one or more techniques of this disclosure.

FIG. 8A is a conceptual diagram illustrating a GUI having five character keys, in accordance with one or more techniques of this disclosure. In the example illustrated with respect to FIG. 8A, GUI 830 includes five character keys: character key 850A, character key 850B, character key 850C, character key 850D, and character key 850E. Each character key of character keys 850 includes some subset of the English alphabet.

Figure 8B:
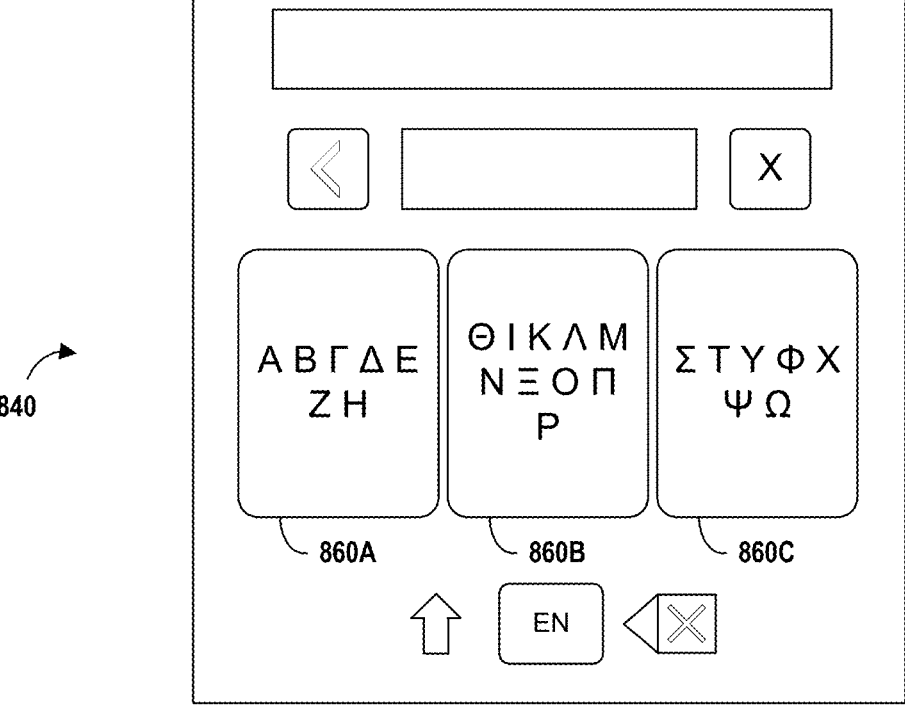
FIG. 8B is a conceptual diagram illustrating a GUI having three character keys, in accordance with one or more techniques of this disclosure.

FIG. 8B is a conceptual diagram illustrating a GUI having three character keys, in accordance with one or more techniques of this disclosure. In the example illustrated with respect to FIG. 8B, GUI 840 includes three character keys: character key 860A, character key 860B, and character key 860C. Each character key of character keys 860 includes some subset of the Greek alphabet. As shown with respect to FIG. 8A and FIG. 8B, various aspects of the present disclosure may implement a GUI having various character keys, where each character key includes two or more alphanumeric characters of a writing system.

FIG. 9 is a flowchart illustrating an example operation for receiving input and providing output via a GUI that uses multi-character keys, in accordance with one or more techniques of this disclosure. The example of FIG. 9 is described with respect to FIG. 2.

A technique for receiving input via multi-character keys may include outputting, by a computing device and for display by a presence-sensitive display, a GUI including a graphical keyboard. The graphical keyboard includes a plurality of character keys, the plurality of character keys including two to eight character keys, each character key from the plurality of character keys being associated with and including a respective plurality of characters, wherein all characters included in the plurality of character keys form a complete alphabet of a writing system (902). For example, FIG. 2 includes GUI 230. GUI 230 includes a keyboard comprising various elements, e.g., space key 262, backspace key 264, and character keys 250. Although the example illustrated with respect to FIG. 2 includes four character keys, other implementations are conceived. For instance, a GUI may include any number of multi-character keys. Further, the multi-character keys may include numerical and/or punctuation characters.

The technique may further include detecting, by the presence-sensitive display, a first user input at a location of the presence-sensitive display associated with a particular character key from the plurality of character keys (904). For example, a user may tap on one of character keys 250. Responsive to receiving the user input, computing device 200 may indicate the selected character key to text-prediction module 218. In some implementations, character keys 250 and/or other keys of GUI 230 may be implemented as push buttons rather than as graphical elements displayed by a presence-sensitive display. For instance, a user may push a multi-character button of I/O components 208.

The technique may also include, responsive to detecting the first user input, determining, by the computing device, a first character, the first character associated with the particular character key (906). Each character key may display each character associated with the respective character key. For example, character key 250D displays and is associated with characters 'O', 'P', 'K', 'L', and 'M'. After receiving input indicating character key 250D, text-prediction module 218 may determine a character associated with character key 250D based on one or more factors, e.g., a computed likelihood that the user intended to select the character.

The technique may additionally include outputting, by the computing device, the first character for display within the text-editing region and a set of suggested words for display within the word-suggestion region, each suggested word of the set of suggested words associated with the particular character key (908). For example, if a user first selects character key 250D, UI device 202 may display any of 'O', 'P', 'K', 'L', or 'M' within text-editing region 232. If a user selects a subsequent key, text-prediction module 218 may redetermine the first character to be any of 'O', 'P', 'K', 'L', or 'M', while following the first character with a character associated with the subsequent key such that the two characters form a candidate word included in a lexicon. Each time the user selects a character key, text-prediction module 218 may determine a new set of suggested words for display within a word-suggestion region of GUI 230.

The technique may also include, responsive to receiving a transition input via an input device of the computing device, transitioning, by the computing device, a focus region from a location of the text-editing region to a location of the word-suggestion region, the focus region associated with text-editing functionality and indicating a single character in the text-editing region or a single suggested word in the word-suggestion region (910). For example, as explained with respect to FIG. 4 and FIG. 5, a user may twist a crown button of computing device 200, causing computing device 200 to receive transition input via the crown. In response to receiving the transition input, computing device 200 may transition a focus region between individual characters (e.g., single characters such as 'l' and 'o') of text-editing region 232 and/or subregions 234A, 234B, and 234C, where each of the subregions include a single suggested word such as "Brook" and "Broom".

As discussed, aspects of this disclosure may enable letter-level input. If a user inputs individual characters via letter-level input, the characters input via letter-level input may not be redetermined despite computing device 200 receiving subsequent character key input. For example, text-editing region 232 and subregions 234 may be blank (e.g., including no characters). A user's first input may indicate character key 250A, the user's second input may indicate character key 250D, the user's third input may indicate the character 'A', and the user's fourth input may indicate character key 250D. In this example, computing device 200 may display 'A' after the first input, "Do" after the second input, "AKA" after the third input, and "Soap" after the fourth input. As discussed, text-prediction module 218 may redetermine text displayed in text-editing region 232 and/or subregions 234 after each input, where individual characters input via letter-level input are not redetermined.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may comprise random-access memory, read-only memory, EEPROM, CD-ROM or other optical disk storage, magnetic disk storage, or other magnetic storage devices, flash memory, or any other storage medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors, general purpose microprocessors, application specific integrated circuits, field programmable logic arrays, or other equivalent integrated or discrete logic circuitry. Accordingly, the term "processor", as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit or a set of integrated circuits (e.g., a chip set). Various components, modules, or units are described in this disclosure to emphasize functional aspects of devices configured to perform the disclosed techniques, but do not necessarily require realization by different hardware units. Rather, various units may be combined in a hardware unit or provided by a collection of intraoperative hardware units, including one or more processors, in conjunction with suitable software and/or firmware.

It is to be recognized that, depending on the example, certain acts or events of any of the techniques described herein may be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in random-access memory or cache).

Example 1: A method includes outputting, by a computing device and for display by a presence-sensitive display, a graphical user interface including: a graphical keyboard comprising a plurality of character keys, the plurality of character keys including two to eight character keys, each character key from the plurality of character keys being associated with and including a respective plurality of characters, wherein all characters included in the plurality of character keys form a complete alphabet of a writing system; a text-editing region; and a word-suggestion region; detecting, by the presence-sensitive display, a first user input at a location of the presence-sensitive display associated with a particular character key from the plurality of character keys; responsive to detecting the first user input, determining, by the computing device, a first character, the first character associated with the particular character key; outputting, by the computing device, the first character for display within the text-editing region and a set of suggested words for display within the word-suggestion region, each suggested word of the set of suggested words associated with the particular character key; and responsive to receiving a transition input via an input device of the computing device, transitioning, by the computing device, a focus region from a location of the text-editing region to a location of the word-suggestion region, the focus region associated with text-editing functionality and indicating a single character in the text-editing region or a single suggested word in the word-suggestion region.

Example 2: The method of example 1, further includes detecting, by the presence-sensitive display, a sequence of second user inputs, each second user input detected at a respective location of the presence-sensitive display, wherein a sequence of character keys of the plurality of character keys is associated with each second user input of the sequence of second user inputs; responsive to detecting the sequence of second user inputs, determining, by the computing device, suggested text, wherein: the suggested text includes a sequence of predicted characters, each predicted character of the sequence of predicted characters determined based on both an associated character key of the sequence of character keys and a respective order of the associated character key in the sequence of character keys; and the suggested text represents a candidate word included in a lexicon; and outputting, by the computing device, the suggested text for display within the text-editing region.

Example 3: The method of any of examples 1 and 2, wherein each suggested word of the set of suggested words: comprises a character associated with the particular character key followed by a string of a set of predicted characters; and represents a candidate word included in a lexicon.

Example 4: The method of any of examples 1 through 3, further includes receiving, by the computing device, a second user input at a second location of the presence-sensitive display associated with a second particular character key from the plurality of character keys, the second user input indicating a subsequent character key of the plurality of character keys; and outputting, by the computing device, a second character for display within the text-editing region, the second character associated with the subsequent character key.

Example 5: The method of example 4, further includes determining, by the computing device and in response to receiving the second user input, suggested text comprising a character associated with the particular character key followed by the second character, the suggested text representing a candidate word included in a lexicon; and outputting, by the computing device, the suggested text for display within the text-editing region.

Example 6: The method of any of examples 4 and 5, further includes determining, by the computing device and in response to receiving the second user input, a subsequent set of suggested words, wherein each suggested word of the subsequent set of suggested words: comprises a character associated with the particular character key followed by a character associated with the subsequent character key, the character associated with the subsequent character key followed by a string of a set of predicted characters; and represents a candidate word included in a lexicon; and outputting, by the computing device, the subsequent set of suggested words for display within the word-suggestion region.

Example 7: The method of any of examples 1 through 6, further includes receiving, by the computing device, a selection input at the word-suggestion region, the selection input indicating a selected word of the set of suggested words; and outputting, by the computing device, the selected word for display within the text-editing region.

Example 8: The method of any of examples 1 through 7, further includes receiving, by the computing device, a long-press input at a second location of the presence-sensitive display associated with a second particular character key from the plurality of character keys, the long-press input indicating a long-press character key of the plurality of character keys; outputting, by the computing device, an overlay for display at a location of the graphical user interface, the overlay comprising a plurality of overlay characters, each character of the plurality of overlay characters associated with the long-press character key; receiving, by the computing device, an overlay input, the overlay input indicating a chosen character of the plurality of overlay characters; and outputting, by the computing device, the chosen character for display within the text-editing region.

Example 9: The method of example 8, wherein outputting the chosen character comprises: removing, by the computing device, a character from the focus region; and outputting, by the computing device, the chosen character for display within the focus region.

Example 10: The method of any of examples 8 and 9, further includes determining, by the computing device and in response to receiving the overlay input, a subsequent set of suggested words, wherein each suggested word of the subsequent set of suggested words: comprises the chosen character followed by a string of a set of predicted characters; and represents a candidate word included in a lexicon; and outputting, by the computing device, the subsequent set of suggested words for display within the word-suggestion region of the graphical user interface.

Example 11: The method of any of examples 1 through 10, further includes outputting, by the computing device, suggested text for display within the text-editing region, the suggested text including a set of characters, wherein the focus region indicates an initial character of the set of characters; receiving, by the computing device, a subsequent transition input via the input device, the subsequent transition input indicating a direction; and responsive to receiving the subsequent transition input, transitioning, by the computing device, the focus region to indicate a subsequent character of the set of characters or a suggested word of the set of suggested words, wherein transitioning the focus region is based on the direction.

Example 12: The method of any of examples 1 through 11, wherein the computing device is a wearable device, the wearable device including the presence-sensitive display and the input device, the input device being a rotating crown button of the wearable device.

Example 13: The method of any of examples 1 through 12, further includes outputting, by the computing device, suggested text for display within the text-editing region, the suggested text including a set of characters, wherein the focus region indicates an initial character of the set of characters; outputting, by the computing device, an overlay for display at a location of the graphical user interface, the overlay comprising a plurality of overlay characters, each character of the plurality of overlay characters associated with the initial character; receiving, by the computing device, an overlay input, the overlay input indicating a chosen character of the plurality of overlay characters; outputting, by the computing device, the chosen character for display within the focus region; outputting, by the computing device, a subsequent set of suggested words for display within the word-suggestion region, each suggested word of the subsequent set of suggested words comprising the chosen character and representing a candidate word included in a lexicon; and responsive to receiving the overlay input, transitioning, by the computing device, the focus region to indicate a subsequent character of the set of characters.

Example 14: The method of any of examples 1 through 13, further includes detecting, by the presence-sensitive display, a continuous gesture input, the continuous gesture input indicating locations of a sequence of characters from one or more character keys of the plurality of character keys; responsive to detecting the continuous gesture input, determining, by the computing device, a subsequent set of suggested words, wherein each suggested word of the subsequent set of suggested words: includes a sequence of predicted characters, the sequence of predicted characters being a subsequence of the sequence of characters; and represents a candidate word included in a lexicon; outputting, by the computing device, the subsequent set of suggested words for display within the word-suggestion region.

Example 15: A computing device includes a presence-sensitive display; an input device; one or more processors; and one or more storage devices storing instructions that, when executed by the one or more processors, cause the one or more processors to: output, for display by the presence-sensitive display, a graphical user interface including: a graphical keyboard comprising a plurality of character keys, the plurality of character keys including two to eight character keys, each character key from the plurality of character keys being associated with and including a respective plurality of characters, wherein all characters included in the plurality of character keys form a complete alphabet of a writing system; a text-editing region; and a word-suggestion region; detect a first user input at a location of the presence-sensitive display associated with a particular character key from the plurality of character keys; responsive to detecting the first user input, determine a first character, the first character associated with the particular character key; output the first character for display within the text-editing region and a set of suggested words for display within the word-suggestion region, each suggested word of the set of suggested words associated with the particular character key; and responsive to receiving a transition input via the input device, transition a focus region from a location of the text-editing region to a location of the word-suggestion region, the focus region associated with text-editing functionality and indicating a single character in the text-editing region or a single suggested word in the word-suggestion region.

Example 16: The computing device of example 15, wherein the instructions further cause the one or more processors to: detect a sequence of second user inputs, each second user input detected at a respective location of the presence-sensitive display, wherein a sequence of character keys of the plurality of character keys is associated with each second user input of the sequence of second user inputs; responsive to detecting the sequence of second user inputs, determine suggested text, wherein: the suggested text includes a sequence of predicted characters, each predicted character of the sequence of predicted characters determined based on both an associated character key of the sequence of character keys and a respective order of the associated character key in the sequence of character keys; and the suggested text represents a candidate word included in a lexicon; and output the suggested text for display within the text-editing region.

Example 17: The computing device of any of examples 15 and 16, wherein each suggested word of the set of suggested words: comprises a character associated with the particular character key followed by a string of a set of predicted characters; and represents a candidate word included in a lexicon.

Example 18: The computing device of any of examples 15 through 17, wherein the instructions further cause the one or more processors to: receive a second user input at a second location of the presence-sensitive display associated with a second particular character key from the plurality of character keys, the second user input indicating a subsequent character key of the plurality of character keys; and output a second character for display within the text-editing region, the second character associated with the subsequent character key.

Example 19: The computing device of example 18, wherein the instructions further cause the one or more processors to: determine, in response to receiving the second user input, suggested text comprising a character associated with the particular character key followed by the second character, the suggested text representing a candidate word included in a lexicon; and output the suggested text for display within the text-editing region.

Example 20: The computing device of any of examples 18 and 19, wherein the instructions further cause the one or more processors to: determine, in response to receiving the second user input, a subsequent set of suggested words, wherein each suggested word of the subsequent set of suggested words: comprises a character associated with the particular character key followed by a character associated with the subsequent character key, the character associated with the subsequent character key followed by a string of a set of predicted characters; and represents a candidate word included in a lexicon; and output the subsequent set of suggested words for display within the word-suggestion region.

Example 21: The computing device of any of examples 15 through 20, wherein the instructions further cause the one or more processors to: receive a selection input at the word-suggestion region, the selection input indicating a selected word of the set of suggested words; and output the selected word for display within the text-editing region.

Example 22: The computing device of any of examples 15 through 21, wherein the instructions further cause the one or more processors to: receive a long-press input at a second location of the presence-sensitive display associated with a second particular character key from the plurality of character keys, the long-press input indicating a long-press character key of the plurality of character keys; output an overlay for display at a location of the graphical user interface, the overlay comprising a plurality of overlay characters, each character of the plurality of overlay characters associated with the long-press character key; receive an overlay input, the overlay input indicating a chosen character of the plurality of overlay characters; and output the chosen character for display within the text-editing region.

Example 23: The computing device of example 22, wherein the instructions further cause the one or more processors to: remove a character from the focus region; and output the chosen character for display within the focus region.

Example 24: The computing device of any of examples 22 and 23, wherein the instructions further cause the one or more processors to: determine a subsequent set of suggested words, wherein each suggested word of the subsequent set of suggested words: comprises the chosen character followed by a string of a set of predicted characters; and represents a candidate word included in a lexicon; and output the subsequent set of suggested words for display within the word-suggestion region of the graphical user interface.

Example 25: The computing device of any of examples 15 through 24, wherein the instructions further cause the one or more processors to: output suggested text for display within the text-editing region, the suggested text including a set of characters, wherein the focus region indicates an initial character of the set of characters; receive a subsequent transition input via the input device, the subsequent transition input indicating a direction; and responsive to receiving the subsequent transition input, transition, by the computing device, the focus region to indicate a subsequent character of the set of characters or a suggested word of the set of suggested words, wherein transitioning the focus region is based on the direction.

Example 26: The computing device of any of examples 15 through 25, wherein the computing device is a wearable device, the wearable device including the presence-sensitive display and the input device, the input device being a rotating crown button of the wearable device.

Example 27: The computing device of any of examples 15 through 26, wherein the instructions further cause the one or more processors to: output suggested text for display within the text-editing region, the suggested text including a set of characters, wherein the focus region indicates an initial character of the set of characters; output an overlay for display at a location of the graphical user interface, the overlay comprising a plurality of overlay characters, each character of the plurality of overlay characters associated with the initial character; receive an overlay input, the overlay input indicating a chosen character of the plurality of overlay characters; output the chosen character for display within the focus region; output a subsequent set of suggested words for display within the word-suggestion region, each suggested word of the subsequent set of suggested words comprising the chosen character and representing a candidate word included in a lexicon; and responsive to receiving the overlay input, transition the focus region to indicate a subsequent character of the set of characters.

Example 28: The computing device of any of examples 15 through 27, wherein the instructions further cause the one or more processors to: detect a continuous gesture input, the continuous gesture input indicating locations of a sequence of characters from one or more character keys of the plurality of character keys; responsive to detecting the continuous gesture input, determine a subsequent set of suggested words, wherein each suggested word of the subsequent set of suggested words: includes a sequence of predicted characters, the sequence of predicted characters being a subsequence of the sequence of characters; and represents a candidate word included in a lexicon; output the subsequent set of suggested words for display within the word-suggestion region.

Example 29: A non-transitory computer-readable storage medium includes output, for display by a presence-sensitive display, a graphical user interface including: a graphical keyboard comprising a plurality of character keys, the plurality of character keys including two to eight character keys, each character key from the plurality of character keys being associated with and including a respective plurality of characters, wherein all characters included in the plurality of character keys form a complete alphabet of a writing system; a text-editing region; and a word-suggestion region; detect a first user input at a location of the presence-sensitive display associated with a particular character key from the plurality of character keys; responsive to detecting the first user input, determine a first character, the first character associated with the particular character key; output the first character for display within the text-editing region and a set of suggested words for display within the word-suggestion region, each suggested word of the set of suggested words associated with the particular character key; and responsive to receiving a transition input via an input device, transition a focus region from a location of the text-editing region to a location of the word-suggestion region, the focus region associated with text-editing functionality and indicating a single character in the text-editing region or a single suggested word in the word-suggestion region.

Example 30: The non-transitory computer-readable storage medium of example 29, wherein the one or more processors further execute the instructions to: detect a sequence of second user inputs, each second user input detected at a respective location of the presence-sensitive display, wherein a sequence of character keys of the plurality of character keys is associated with each second user input of the sequence of second user inputs; responsive to detecting the sequence of second user inputs, determine suggested text, wherein: the suggested text includes a sequence of predicted characters, each predicted character of the sequence of predicted characters determined based on both an associated character key of the sequence of character keys and a respective order of the associated character key in the sequence of character keys; and the suggested text represents a candidate word included in a lexicon; and output the suggested text for display within the text-editing region.

Example 31: The non-transitory computer-readable storage medium of any of examples 29 and 30, wherein each suggested word of the set of suggested words: comprises a character associated with the particular character key followed by a string of a set of predicted characters; and represents a candidate word included in a lexicon.

Example 32: The non-transitory computer-readable storage medium of any of examples 29 through 31, wherein the one or more processors further execute the instructions to: receive a second user input at a second location of the presence-sensitive display associated with a second particular character key from the plurality of character keys, the second user input indicating a subsequent character key of the plurality of character keys; and output a second character for display within the text-editing region, the second character associated with the subsequent character key.

Example 33: The non-transitory computer-readable storage medium of example 32, wherein the one or more processors further execute the instructions to: determine, in response to receiving the second user input, suggested text comprising a character associated with the particular character key followed by the second character, the suggested text representing a candidate word included in a lexicon; and output the suggested text for display within the text-editing region.

Example 34: The non-transitory computer-readable storage medium of any of examples 32 and 33, wherein the one or more processors further execute the instructions to: determine, in response to receiving the second user input, a subsequent set of suggested words, wherein each suggested word of the subsequent set of suggested words: comprises a character associated with the particular character key followed by a character associated with the subsequent character key, the character associated with the subsequent character key followed by a string of a set of predicted characters; and represents a candidate word included in a lexicon; and output the subsequent set of suggested words for display within the word-suggestion region.

Example 35: The non-transitory computer-readable storage medium of any of examples 29 through 34, wherein the one or more processors further execute the instructions to: receive a selection input at the word-suggestion region, the selection input indicating a selected word of the set of suggested words; and output the selected word for display within the text-editing region.

Example 36: The non-transitory computer-readable storage medium of any of examples 29 through 35, wherein the one or more processors further execute the instructions to: receive a long-press input at a second location of the presence-sensitive display associated with a second particular character key from the plurality of character keys, the long-press input indicating a long-press character key of the plurality of character keys; output an overlay for display at a location of the graphical user interface, the overlay comprising a plurality of overlay characters, each character of the plurality of overlay characters associated with the long-press character key; receive an overlay input, the overlay input indicating a chosen character of the plurality of overlay characters; and output the chosen character for display within the text-editing region.

Example 37: The non-transitory computer-readable storage medium of example 36, wherein the one or more processors further execute the instructions to: remove a character from the focus region; and output the chosen character for display within the focus region.

Example 38: The non-transitory computer-readable storage medium of any of examples 36 and 37, wherein the one or more processors further execute the instructions to: determine a subsequent set of suggested words, wherein each suggested word of the subsequent set of suggested words: comprises the chosen character followed by a string of a set of predicted characters; and represents a candidate word included in a lexicon; and output the subsequent set of suggested words for display within the word-suggestion region of the graphical user interface.

Example 39: The non-transitory computer-readable storage medium of any of examples 29 through 38, wherein the one or more processors further execute the instructions to: output suggested text for display within the text-editing region, the suggested text including a set of characters, wherein the focus region indicates an initial character of the set of characters; receive a subsequent transition input via the input device, the subsequent transition input indicating a direction; and responsive to receiving the subsequent transition input, transition, by the computing device, the focus region to indicate a subsequent character of the set of characters or a suggested word of the set of suggested words, wherein transitioning the focus region is based on the direction.

Example 40: The non-transitory computer-readable storage medium of any of examples 29 through 39, wherein the computing device is a wearable device, the wearable device including the presence-sensitive display and the input device, the input device being a rotating crown button of the wearable device.

Example 41: The non-transitory computer-readable storage medium of any of examples 29 through 40, wherein the one or more processors further execute the instructions to: output suggested text for display within the text-editing region, the suggested text including a set of characters, wherein the focus region indicates an initial character of the set of characters; output an overlay for display at a location of the graphical user interface, the overlay comprising a plurality of overlay characters, each character of the plurality of overlay characters associated with the initial character; receive an overlay input, the overlay input indicating a chosen character of the plurality of overlay characters; output the chosen character for display within the focus region; output a subsequent set of suggested words for display within the word-suggestion region, each suggested word of the subsequent set of suggested words comprising the chosen character and representing a candidate word included in a lexicon; and responsive to receiving the overlay input, transition the focus region to indicate a subsequent character of the set of characters.

Example 42: The non-transitory computer-readable storage medium of any of examples 29 through 41, wherein the one or more processors further execute the instructions to: detect a continuous gesture input, the continuous gesture input indicating locations of a sequence of characters from one or more character keys of the plurality of character keys; responsive to detecting the continuous gesture input, determine a subsequent set of suggested words, wherein each suggested word of the subsequent set of suggested words: includes a sequence of predicted characters, the sequence of predicted characters being a subsequence of the sequence of characters; and represents a candidate word included in a lexicon; output the subsequent set of suggested words for display within the word-suggestion region.

Example 43: A computing system comprising means for performing any combination of examples 1 through 14.

Example 44: A computer program product comprising one or more instructions that, when executed by a computing device, cause the computing device to perform any combination of examples 1 through 14.

What is claimed is:

1. A method comprising:
outputting, by a computing device and for display by a presence-sensitive display, a graphical user interface including:
a graphical keyboard comprising a plurality of character keys, the plurality of character keys including two to eight character keys, each character key from the plurality of character keys being associated with and including a respective plurality of characters, wherein all characters included in the plurality of character keys form a complete alphabet of a writing system;
a text-editing region; and
a word-suggestion region;
detecting, by the presence-sensitive display, a first user input at a location of the presence-sensitive display associated with a particular character key from the plurality of character keys;

responsive to detecting the first user input, determining, by the computing device, a first character, the first character associated with the particular character key;
outputting, by the computing device, the first character for display within the text-editing region and a set of suggested words for display within the word-suggestion region, each suggested word of the set of suggested words associated with the particular character key; and
responsive to receiving a transition input via an input device of the computing device, transitioning, by the computing device, a focus region from a location of the text-editing region to a location of the word-suggestion region, the focus region associated with text-editing functionality and indicating a single character in the text-editing region or a single suggested word in the word-suggestion region.

2. The method of claim 1, further comprising:
detecting, by the presence-sensitive display, a sequence of second user inputs, each second user input detected at a respective location of the presence-sensitive display, wherein a sequence of character keys of the plurality of character keys is associated with each second user input of the sequence of second user inputs;
responsive to detecting the sequence of second user inputs, determining, by the computing device, suggested text, wherein:
the suggested text includes a sequence of predicted characters, each predicted character of the sequence of predicted characters determined based on both an associated character key of the sequence of character keys and a respective order of the associated character key in the sequence of character keys; and
the suggested text represents a candidate word included in a lexicon; and
outputting, by the computing device, the suggested text for display within the text-editing region.

3. The method of claim 1, wherein each suggested word of the set of suggested words:
comprises a character associated with the particular character key followed by a string of a set of predicted characters; and
represents a candidate word included in a lexicon.

4. The method of claim 1, further comprising:
receiving, by the computing device, a second user input at a second location of the presence-sensitive display associated with a second particular character key from the plurality of character keys, the second user input indicating a subsequent character key of the plurality of character keys; and
outputting, by the computing device, a second character for display within the text-editing region, the second character associated with the subsequent character key.

5. The method of claim 4, further comprising:
determining, by the computing device and in response to receiving the second user input, suggested text comprising a character associated with the particular character key followed by the second character, the suggested text representing a candidate word included in a lexicon; and
outputting, by the computing device, the suggested text for display within the text-editing region.

6. The method of claim 4, further comprising:
determining, by the computing device and in response to receiving the second user input, a subsequent set of suggested words, wherein each suggested word of the subsequent set of suggested words:

comprises a character associated with the particular character key followed by a character associated with the subsequent character key, the character associated with the subsequent character key followed by a string of a set of predicted characters; and represents a candidate word included in a lexicon; and outputting, by the computing device, the subsequent set of suggested words for display within the word-suggestion region.

7. The method of claim 1, further comprising:

receiving, by the computing device, a selection input at the word-suggestion region, the selection input indicating a selected word of the set of suggested words; and outputting, by the computing device, the selected word for display within the text-editing region.

8. The method of claim 1, further comprising:

receiving, by the computing device, a long-press input at a second location of the presence-sensitive display associated with a second particular character key from the plurality of character keys, the long-press input indicating a long-press character key of the plurality of character keys;

outputting, by the computing device, an overlay for display at a location of the graphical user interface, the overlay comprising a plurality of overlay characters, each character of the plurality of overlay characters associated with the long-press character key;

receiving, by the computing device, an overlay input, the overlay input indicating a chosen character of the plurality of overlay characters; and outputting, by the computing device, the chosen character for display within the text-editing region.

9. The method of claim 8, wherein outputting the chosen character comprises:

removing, by the computing device, a character from the focus region; and outputting, by the computing device, the chosen character for display within the focus region.

10. The method of claim 8, further comprising:

determining, by the computing device and in response to receiving the overlay input, a subsequent set of suggested words, wherein each suggested word of the subsequent set of suggested words:

comprises the chosen character followed by a string of a set of predicted characters; and represents a candidate word included in a lexicon; and outputting, by the computing device, the subsequent set of suggested words for display within the word-suggestion region of the graphical user interface.

11. The method of claim 1, further comprising:

outputting, by the computing device, suggested text for display within the text-editing region, the suggested text including a set of characters, wherein the focus region indicates an initial character of the set of characters;

receiving, by the computing device, a subsequent transition input via the input device, the subsequent transition input indicating a direction; and responsive to receiving the subsequent transition input, transitioning, by the computing device, the focus region to indicate a subsequent character of the set of characters or a suggested word of the set of suggested words, wherein transitioning the focus region is based on the direction.

12. The method of claim 1, wherein the computing device is a wearable device, the wearable device including the presence-sensitive display and the input device, the input device being a rotating crown button of the wearable device.

13. The method of claim 1, further comprising:

outputting, by the computing device, suggested text for display within the text-editing region, the suggested text including a set of characters, wherein the focus region indicates an initial character of the set of characters;

outputting, by the computing device, an overlay for display at a location of the graphical user interface, the overlay comprising a plurality of overlay characters, each character of the plurality of overlay characters associated with the initial character;

receiving, by the computing device, an overlay input, the overlay input indicating a chosen character of the plurality of overlay characters;

outputting, by the computing device, the chosen character for display within the focus region;

outputting, by the computing device, a subsequent set of suggested words for display within the word-suggestion region, each suggested word of the subsequent set of suggested words comprising the chosen character and representing a candidate word included in a lexicon; and responsive to receiving the overlay input, transitioning, by the computing device, the focus region to indicate a subsequent character of the set of characters.

14. The method of claim 1, further comprising:

detecting, by the presence-sensitive display, a continuous gesture input, the continuous gesture input indicating locations of a sequence of characters from one or more character keys of the plurality of character keys;

responsive to detecting the continuous gesture input, determining, by the computing device, a subsequent set of suggested words, wherein each suggested word of the subsequent set of suggested words:

includes a sequence of predicted characters, the sequence of predicted characters being a subsequence of the sequence of characters; and represents a candidate word included in a lexicon; and outputting, by the computing device, the subsequent set of suggested words for display within the word-suggestion region.

15. A computing device comprising:

a presence-sensitive display;

an input device;

one or more processors; and one or more storage devices storing instructions that, when executed by the one or more processors, cause the one or more processors to:

output, for display by the presence-sensitive display, a graphical user interface including:

a graphical keyboard comprising a plurality of character keys, the plurality of character keys including two to eight character keys, each character key from the plurality of character keys being associated with and including a respective plurality of characters, wherein all characters included in the plurality of character keys form a complete alphabet of a writing system;

a text-editing region; and a word-suggestion region;

detect a first user input at a location of the presence-sensitive display associated with a particular character key from the plurality of character keys;

responsive to detecting the first user input, determine a first character, the first character associated with the particular character key;

output the first character for display within the text-editing region and a set of suggested words for display within the word-suggestion region, each suggested word of the set of suggested words associated with the particular character key; and responsive to receiving a transition input via the input device, transition a focus region from a location of the text-editing region to a location of the word-suggestion region, the focus region associated with text-editing functionality and indicating a single character in the text-editing region or a single suggested word in the word-suggestion region.

16. The computing device of claim 15, wherein the instructions further cause the one or more processors to:

detect a sequence of second user inputs, each second user input detected at a respective location of the presence-sensitive display, wherein a sequence of character keys of the plurality of character keys is associated with each second user input of the sequence of second user inputs;

responsive to detecting the sequence of second user inputs, determine suggested text, wherein:

the suggested text includes a sequence of predicted characters, each predicted character of the sequence of predicted characters determined based on both an associated character key of the sequence of character keys and a respective order of the associated character key in the sequence of character keys; and the suggested text represents a candidate word included in a lexicon; and output the suggested text for display within the text-editing region.

17. The computing device of claim 15, wherein each suggested word of the set of suggested words:

comprises a character associated with the particular character key followed by a string of a set of predicted characters; and represents a candidate word included in a lexicon.

18. The computing device of claim 15, wherein the instructions further cause the one or more processors to:

receive a second user input at a second location of the presence-sensitive display associated with a second particular character key from the plurality of character keys, the second user input indicating a subsequent character key of the plurality of character keys; and output a second character for display within the text-editing region, the second character associated with the subsequent character key.

19. The computing device of claim 18, wherein the instructions further cause the one or more processors to:

determine, in response to receiving the second user input, suggested text comprising a character associated with the particular character key followed by the second character, the suggested text representing a candidate word included in a lexicon; and output the suggested text for display within the text-editing region.

20. A non-transitory computer-readable storage medium comprising instructions, that when executed by one or more processors of a computing device, cause the one or more processors to:

output, for display by a presence-sensitive display, a graphical user interface including:

a graphical keyboard comprising a plurality of character keys, the plurality of character keys including two to eight character keys, each character key from the plurality of character keys being associated with and including a respective plurality of characters, wherein all characters included in the plurality of character keys form a complete alphabet of a writing system;

a text-editing region; and a word-suggestion region;

detect a first user input at a location of the presence-sensitive display associated with a particular character key from the plurality of character keys;

responsive to detecting the first user input, determine a first character, the first character associated with the particular character key;

output the first character for display within the text-editing region and a set of suggested words for display within the word-suggestion region, each suggested word of the set of suggested words associated with the particular character key; and responsive to receiving a transition input via an input device, transition a focus region from a location of the text-editing region to a location of the word-suggestion region, the focus region associated with text-editing functionality and indicating a single character in the text-editing region or a single suggested word in the word-suggestion region.

* * * * *